US012632529B2

(12) United States Patent
Satoh et al.

(10) Patent No.: US 12,632,529 B2
(45) Date of Patent: May 19, 2026

(54) AUTHENTICATION SYSTEM, AUTHENTICATION METHOD, AND NON-TRANSITORY RECORDING MEDIUM

(71) Applicant: NEC Corporation, Tokyo (JP)

(72) Inventors: Masataka Satoh, Tokyo (JP); Hideki Irisawa, Tokyo (JP); Takayuki Kase, Tokyo (JP); Naoki Tokunaga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 29 days.

(21) Appl. No.: 18/722,799

(22) PCT Filed: Dec. 24, 2021

(86) PCT No.: PCT/JP2021/048291
§ 371 (c)(1),
(2) Date: Jun. 21, 2024

(87) PCT Pub. No.: WO2023/119643
PCT Pub. Date: Jun. 29, 2023

(65) Prior Publication Data
US 2025/0045369 A1 Feb. 6, 2025

(51) Int. Cl.
*G06F 21/00* (2013.01)
*G06F 21/32* (2013.01)
(Continued)

(52) U.S. Cl.
CPC ............ *G06F 21/32* (2013.01); *G06V 40/166* (2022.01); *G06V 40/172* (2022.01); *G06V 40/50* (2022.01);
(Continued)

(58) Field of Classification Search
CPC .... G06F 21/32; G06V 40/172; G06V 40/166; G06V 40/50; H04N 23/667; H04N 23/611
See application file for complete search history.

(56) References Cited

U.S. PATENT DOCUMENTS

| | | | |
|---|---|---|---|
| 10,009,496 B2 | 6/2018 | Horishita | |
| 10,719,919 B1 | 7/2020 | Kosugi et al. | |
| | (Continued) | | |

FOREIGN PATENT DOCUMENTS

| | | |
|---|---|---|
| JP | 2008-097379 A | 4/2008 |
| JP | 2011-182028 A | 9/2011 |
| | (Continued) | |

OTHER PUBLICATIONS

International Search Report for PCT Application No. PCT/JP2021/048291, mailed on Mar. 8, 2022.
(Continued)

*Primary Examiner* — Ghodrat Jamshidi
(74) *Attorney, Agent, or Firm* — Sughrue Mion, PLLC

(57) ABSTRACT

An authentication system includes: an imaging unit that is configure to switch between normal imaging and blur imaging that is imaging in a state of blurring with lower sharpness than that in the normal imaging; a target detection unit that detects an authentication target on the basis of a blurred image acquired by the blur imaging; a switching unit that switches the blur imaging to the normal imaging in a case where the authentication target is detected; and an authentication unit that performs authentication processing of authenticating the authentication targe on the basis of a normal image acquired by the normal imaging. According to such an authentication system, it is possible to perform the authentication processing in consideration of the privacy of the target.

11 Claims, 23 Drawing Sheets

(51) Int. Cl.

| | |
|---|---|
| *G06V 40/16* | (2022.01) |
| *G06V 40/50* | (2022.01) |
| *H04N 23/611* | (2023.01) |
| *H04N 23/667* | (2023.01) |

(52) U.S. Cl.
CPC ......... *H04N 23/611* (2023.01); *H04N 23/667*
(2023.01)

(56) References Cited

U.S. PATENT DOCUMENTS

| | | | |
|---|---|---|---|
| 2009/0141141 A1* | 6/2009 | Onozawa ............... | H04N 23/61 |
| | | | 348/222.1 |
| 2016/0182814 A1* | 6/2016 | Schwesinger ........ | H04N 23/661 |
| | | | 348/14.03 |
| 2016/0277618 A1 | 9/2016 | Horishita | |
| 2017/0019589 A1* | 1/2017 | Moon .................... | H04N 5/145 |
| 2019/0080189 A1 | 3/2019 | Van et al. | |
| 2019/0082101 A1* | 3/2019 | Baldwin ................ | H04N 23/69 |
| 2019/0205694 A1* | 7/2019 | Wang ................... | G06V 40/165 |
| 2020/0084388 A1 | 3/2020 | Iinuma et al. | |
| 2020/0139931 A1 | 5/2020 | Mukasa et al. | |
| 2020/0302572 A1 | 9/2020 | Ohira et al. | |
| 2022/0028115 A1* | 1/2022 | Sabripour ............. | H04N 23/71 |
| 2022/0058248 A1* | 2/2022 | Cohen ..................... | G06F 21/32 |
| 2022/0374855 A1* | 11/2022 | Balaoro .................. | H04W 4/80 |
| 2022/0394171 A1* | 12/2022 | Dayana .................. | H04N 23/61 |
| 2023/0171493 A1* | 6/2023 | Omelchenko ......... | G01S 13/867 |
| | | | 348/346 |
| 2023/0222842 A1* | 7/2023 | Hua ..................... | G06V 40/172 |
| | | | 382/181 |

FOREIGN PATENT DOCUMENTS

| | | |
|---|---|---|
| JP | 2012-010256 A | 1/2012 |
| JP | 2016-178348 A | 10/2016 |
| JP | 2018-160799 | 10/2018 |
| JP | 2020-525868 A | 8/2020 |
| JP | 2020-140430 A | 9/2020 |
| JP | 2020-154808 A | 9/2020 |
| WO | 2019/003826 | 1/2019 |

OTHER PUBLICATIONS

Extended European Search Report for EP Application No. 21969074.
0, dated on Jan. 27, 2025.
JP Office Action for JP Application No. 2023-569005, mailed on
Mar. 18, 2025 with English Translation.

* cited by examiner

STANDBY STATE

REMOVE BLURRING

AUTHENTICATION STATE

STANDBY STATE

CANCEL BLURRING
ONLY IN FACE AREA

AUTHENTICATION STATE

STANDBY STATE

CANCEL BLURRING ONLY IN
FACE AREA OF USER WHO IS AT
THE FRONT/AT THE HEAD

AUTHENTICATION STATE

BEFORE TARGET IS DETECTED : STRONG BLURRING

IMMEDIATELY AFTER TARGET IS DETECTED : WEAK BLURRING

TARGET IS FURTHER APPROACHING : OFF BLURRING

AUTHENTICATION SYSTEM, AUTHENTICATION METHOD, AND NON-TRANSITORY RECORDING MEDIUM

This application is a National Stage Entry of PCT/JP2021/048291 filed on Dec. 24, 2021, the contents of all of which are incorporated herein by reference, in their entirety.

TECHNICAL FIELD

This disclosure relates to technical fields of an authentication system, an authentication method, and a recording medium.

BACKGROUND ART

In a system that captures an image of a target, processing of blurring the image may be performed in consideration of privacy. For example, Patent Literature 1 discloses a technique/technology of changing a blur degree in accordance with a degree of approach of a monitoring target person. Patent Literature 2 discloses a technique/technology of performing blurring on a background area other than a main subject, but canceling the blurring in a period of the authentication processing. Patent Literature 3 discloses a technique/technology of determining blur intensity on the basis of an attribute of a detected person.

CITATION LIST

Patent Literature

Patent Literature 1: JP2008-097379A
Patent Literature 2: JP2020-140430A
Patent Literature 3: JP2020-154808A

SUMMARY

Technical Problem

This disclosure aims to improve the techniques/technologies disclosed in Citation List.

Solution to Problem

An authentication system according to an example aspect of this disclosure includes: an imaging unit that is configure to switch between normal imaging and blur imaging that is imaging in a state of blurring with lower sharpness than that in the normal imaging; a target detection unit that detects an authentication target on the basis of a blurred image acquired by the blur imaging; a switching unit that switches the blur imaging to the normal imaging in a case where the authentication target is detected; and an authentication unit that performs authentication processing of authenticating the authentication targe on the basis of a normal image acquired by the normal imaging.

An authentication method according to an example aspect of this disclosure is an authentication method using an imaging unit that is configure to switch between normal imaging and blur imaging that is imaging in a state of blurring with lower sharpness than that in the normal imaging, the authentication method including: detecting an authentication target on the basis of a blurred image acquired by the blur imaging; switching the blur imaging to the normal imaging in a case where the authentication target is detected; and performing authentication processing of authenticating the authentication targe on the basis of a normal image acquired by the normal imaging.

A recording medium according to an example aspect of this disclosure is a recording medium on which a computer program that allows at least one computer to execute an authentication method is recorded, the authentication method using a imaging unit that can switch between a normal imaging and a blur imaging in which the sharpness is lower than that of the normal imaging, the authentication method including: detecting an authentication target on the basis of a blurred image acquired by the blur imaging; switching the blur imaging to the normal imaging in a case where the authentication target is detected; and performing authentication processing of authenticating the authentica-tion targe on the basis of a normal image acquired by the normal imaging.

DESCRIPTION OF EXAMPLE EMBODIMENTS

Hereinafter, an authentication system, an authentication method, and a recording medium according to example embodiments will be described with reference to the drawings.

First Example Embodiment

An authentication system according to a first example embodiment will be described with reference to FIG. 1 to FIG. 7.

(Hardware Configuration)

Figure 1:
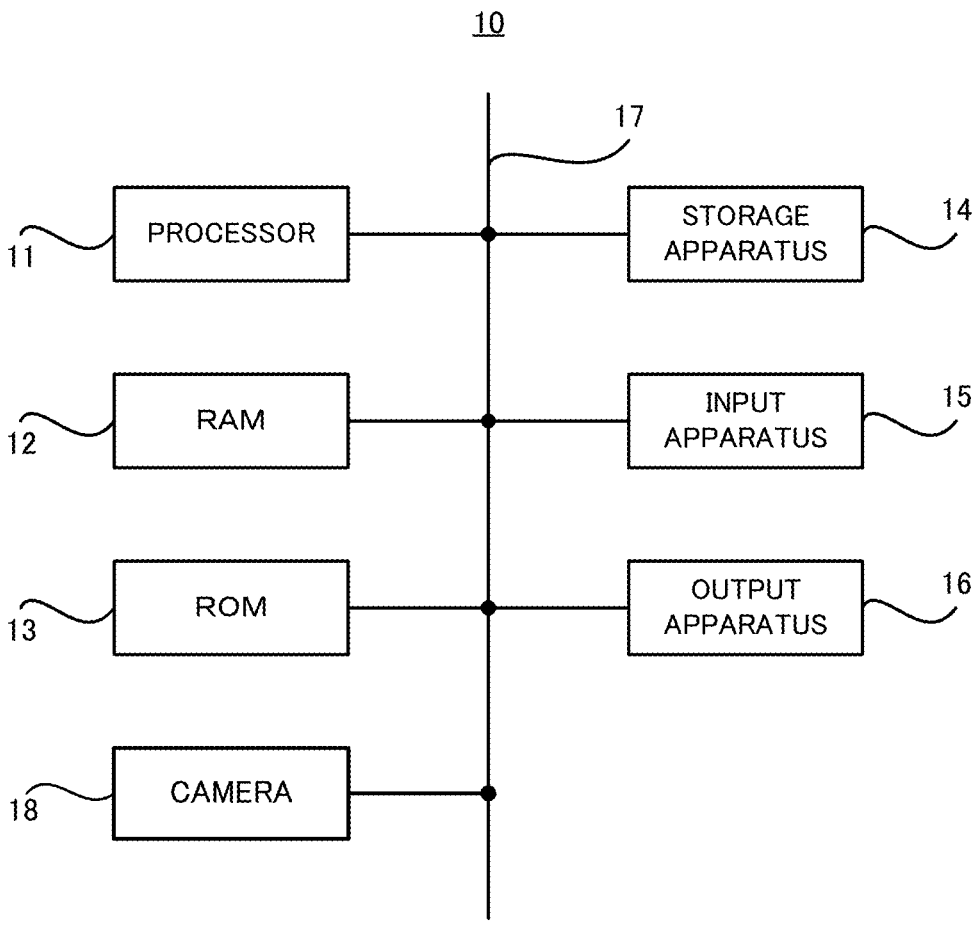
FIG. 1 is a block diagram illustrating a hardware configuration of an authentication system according to a first example embodiment.

First, a hardware configuration of the authentication system according to the first example embodiment will be described with reference to FIG. 1. FIG. 1 is a block diagram illustrating the hardware configuration of the authentication system according to the first example embodiment.

As illustrated in FIG. 1, an authentication system 10 according to the first example embodiment includes a processor 11, a RAM (Random Access Memory) 12, a ROM (Read Only Memory) 13, and a storage apparatus 14. The authentication system 10 may further include an input apparatus 15 and an output apparatus 16. The aforementioned processor 11, the RAM 12, the ROM 13, the storage apparatus 14, the input apparatus 15, and the output apparatus 16 are connected through a data bus 17.

The processor 11 reads a computer program. For example, the processor 11 is configured to read a computer program stored by at least one of the RAM 12, the ROM 13 and the storage apparatus 14. Alternatively, the processor 11 may read a computer program stored in a computer-readable recording medium, by using a not-illustrated recording medium reading apparatus. The processor 11 may acquire (i.e., may read) a computer program from a not-illustrated apparatus disposed outside the authentication system 10, through a network interface. The processor 11 controls the RAM 12, the storage apparatus 14, the input apparatus 15, and the output apparatus 16 by executing the read computer program. Especially in the present example embodiment, when the processor 11 executes the read computer program, a functional block for imaging a target and performing authentication processing, is realized in the processor 11. That is, the processor 11 may function as a controller for executing each control in the authentication system 10.

The processor 11 may be configured as, for example, a CPU (Central Processing Unit), a GPU (Graphics Processing Unit), a FPGA (Field-Programmable Gate Array), a DSP (Demand-Side Platform), or an ASIC (Application Specific Integrated Circuit). The processor 11 may be one of them, or may use a plurality of them in parallel.

The RAM 12 temporarily stores the computer program to be executed by the processor 11. The RAM 12 temporarily stores the data that are temporarily used by the processor 11 when the processor 11 executes the computer program. The RAM 12 may be, for example, a D-RAM (Dynamic Random Access Memory) or a SRAM (Static Random Access Memory). Furthermore, another type of volatile memory may also be used instead of the RAM 12.

The ROM 13 stores the computer program to be executed by the processor 11. The ROM 13 may otherwise store fixed data. The ROM 13 may be, for example, a P-ROM (Programmable Read Only Memory) or an EPROM (Erasable Read Only Memory). Furthermore, another type of nonvolatile memory may also be used instead of the ROM 13.

The storage apparatus 14 stores the data that are stored by the authentication system 10 for a long time. The storage apparatus 14 may operate as a temporary/transitory storage apparatus of the processor 11. The storage apparatus 14 may include, for example, at least one of a hard disk apparatus, a magneto-optical disk apparatus, a SSD (Solid State Drive), and a disk array apparatus.

The input apparatus 15 is an apparatus that receives an input instruction from a user of the authentication system 10. The input apparatus 15 may include, for example, at least one of a keyboard, a mouse, and a touch panel. The input apparatus 15 may be configured as a portable terminal such as a smartphone and a tablet. The input apparatus 15 may be an apparatus that allows audio input/voice input, including a microphone, for example.

The output apparatus 16 is an apparatus that outputs information about the authentication system 10. For example, the output apparatus 16 may be a display apparatus (e.g., a display) that is configured to display the information about authentication system 10. Furthermore, the output apparatus 16 may be a speaker or the like that is configured to audio-output the information about the authentication system 10. The output apparatus 16 may be configured as a portable terminal such as a smartphone and a tablet. The output apparatus 16 may be an apparatus that outputs information in a format other than an image. For example, the output apparatus 16 may be a speaker that audio-outputs the information about authentication system 10.

A camera 18 is provided to image an authentication target of the authentication system 10. That is, the camera is configure to capture an image (e.g., a face image of the target, etc.) used for the authentication processing of authenticating the target. The type of the camera 18 is not particularly limited, and may be, for example, a visible light camera, or a near-infrared camera. A more specific configuration example of the camera 18 will be described in detail later.

Of the hardware described in FIG. 1, a part of the hardware may be provided in an apparatus other than the authentication system 10. For example, the authentication system 10 may include only the processor 11, the RAM 12, and the ROM 13, and the other components (i.e., the storage apparatus 14, the input apparatus 15, the output apparatus 16) may be provided in an external apparatus connected to the authentication system 10, for example. In addition, in the authentication system 10, a part of an arithmetic function may be realized by an external apparatus (e.g., an external server or cloud, etc.).

(Configuration Example of Camera)

Figure 2:
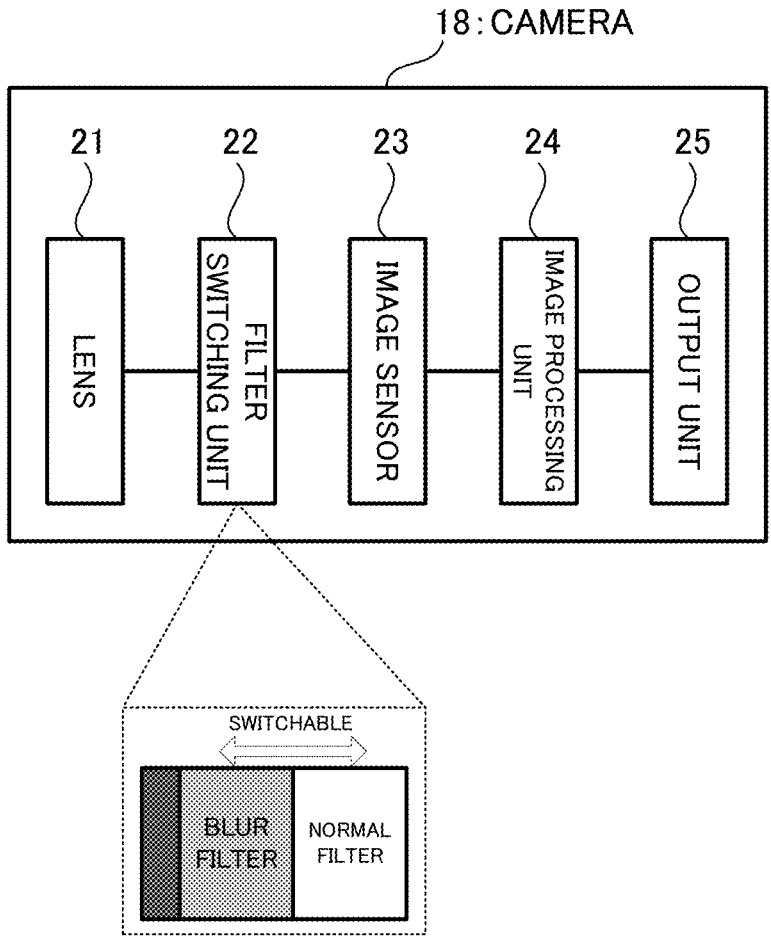
FIG. 2 is a block diagram illustrating a specific configuration of a camera provided in the authentication system according to the first example embodiment.

Next, a specific configuration example of the camera 18 will be described with reference to FIG. 2. FIG. 2 is a block diagram illustrating the specific configuration of the camera provided in the authentication system according to the first example embodiment.

As illustrated in FIG. 2, the camera 18 according to the first example embodiment includes, as its main components, a lens 21, a filter switching unit 22, an image sensor 23, an imaging processing unit 24, and an output unit 25. In imaging by the camera 18, light entering the lens 21 passes through the filter switching unit 22 (to be precise, a filter provided in the filter switching unit) and an image is formed by the image sensor 23. Then, the imaging processing unit 24 performs various types of image processing on an output of the image sensor, and image data are outputted by the output unit 25.

The filter switching unit 22 includes a blur filter and a normal filter, and is configured to be switch an imaging mode by switching them. Specifically, when a state is switched by the filter switching unit 22 into a state where the blur filter is used, the camera 18 performs blur imaging (i.e., imaging in a state of blurring with low sharpness/clarity). On the other hand, when the state is switched by the filter switching unit 22 into a state where the normal filter is used, the camera 18 performs normal imaging (i.e., imaging in a state of non-blurring with high sharpness). The "blur imaging" here may only be required to be imaging with sharpness that is low enough to protect the privacy of the authentication target to be imaged. The filter switching unit 22 may switch between the normal imaging and the blur imaging by switching different types of filters as described above, or may switch between the normal imaging and the blur imaging by switching between a state where the light is electrically transmitted and a state where the light is semi-transmitted by using a filter including a liquid crystal or the like.

The above configuration is merely an example, and the camera 18 may include different components. Especially, the camera 18 may be capable of realizing the normal imaging and the blur imaging, by using a different component from the filter switching unit 22. That is, the configuration in which the normal imaging and the blur imaging are switchable, is not limited to the configuration in which the filter is used. For example, the camera 18 may perform the normal imaging with the focus set on the target, and may perform the blur imaging with the focus purposely removed from the target. Alternatively, the camera 18 may perform the normal imaging by adjusting values of exposure and shutter speed to appropriate values, and may perform the blur imaging by purposely removing the values of exposure and shutter speed from the appropriate values. Alternatively, the camera 18 may perform the blur imaging by intentionally making a rough image (e.g., lowering resolution).

(Functional Configuration)

Figure 3:
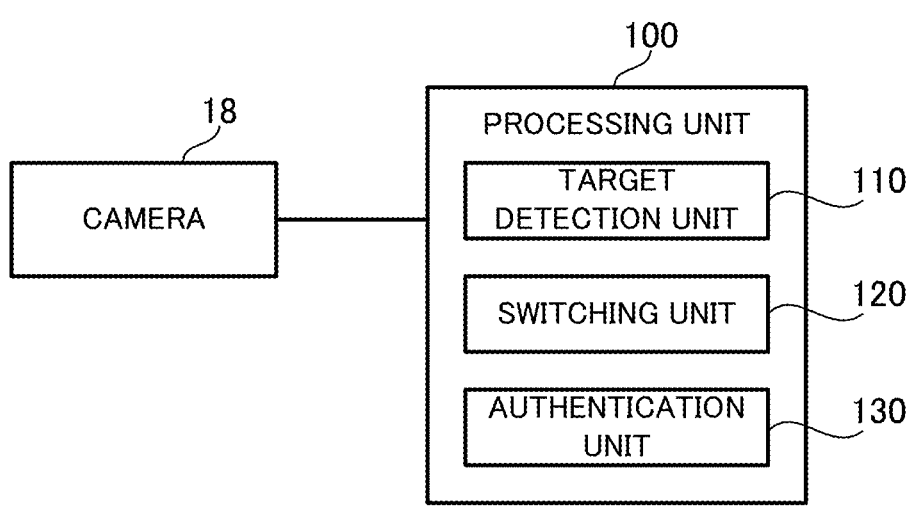
FIG. 3 is a block diagram illustrating a functional configuration of the authentication according to the first example embodiment.

Next, with reference to FIG. 3, a functional configuration of the authentication system 10 according to the first example embodiment will be described. FIG. 3 is a block diagram illustrating the functional configuration of the authentication system according to the first example embodiment.

As illustrated in FIG. 3, the authentication system 10 according to the first example embodiment includes the camera 18 and a processing unit 100. The processing unit 100 is configured to perform various types of processing in the authentication system 10. The processing unit 100 includes, as components for realizing the functions thereof, a target detection unit 110, a switching unit 120, and an authentication unit 130. Each of the target detection unit 110, the switching unit 120, and the authentication unit 130 may be a functional block realized by the processor 11 (see FIG. 1), for example. A part or all of the functions of the processing unit 100 may be realized or implemented in the camera 18.

The target detection unit 110 is configured to detect the presence of the authentication target (i.e., the target on whom the authentication processing is to be performed), on the basis of a blurred image captured by the blur imaging. A specific method of detecting the authentication target is not particularly limited. A specific example of the detection method will be described in detail in another example embodiment later.

The switching unit 120 is configured to switch the blur imaging to the normal imaging in a case where the authentication target is detected by the target detection unit 110. The switching unit 120 switches the blur imaging to the normal imaging, by controlling the filter switching unit 22 (see FIG. 2), for example.

The authentication unit 130 performs the authentication processing of authenticating the authentication target, on the basis of a normal image acquired by the normal imaging, after the blur imaging is switched to the normal imaging by the switching unit 120. The authentication processing here is typically face recognition, but may also be another authentication using an image (e.g., iris recognition, etc.). A detailed description of the specific method of the authentication processing will be omitted here, since the existing technologies/techniques may be applied accordingly. The authentication unit 130 may have a function of outputting an authentication result. The authentication unit 130 may be configured to perform various controls (e.g., opening and closing of a gate) in accordance with the authentication result.

(Flow of Operation)

Figure 4:
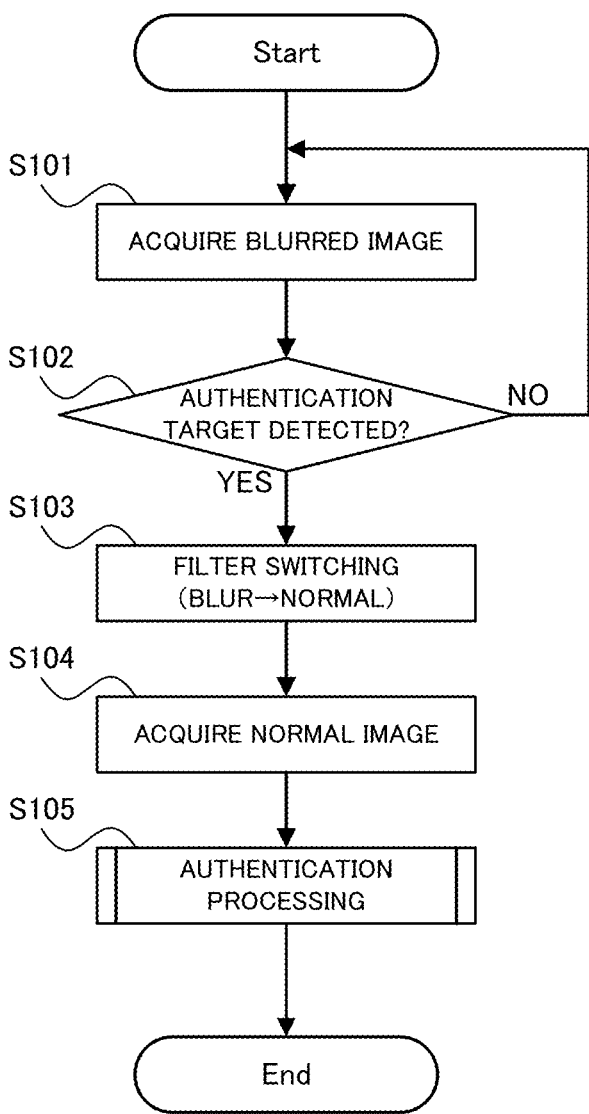
FIG. 4 is a flowchart illustrating a flow of operation by the authentication system according to the first example embodiment.

Next, with reference to FIG. 4, a flow of operation of the authentication system 10 according to the first example embodiment will be described. FIG. 4 is a flowchart illustrating the flow of the operation of the authentication system according to the first example embodiment.

As illustrated in FIG. 4, when the operation of the authentication system 10 according to the first example embodiment is started, first, the target detection unit 110 acquires the blurred image captured by the blur imaging (step S101). Then, the target detection unit 110 detects the presence of the authentication target on the basis of the acquired blurred image (step S102). When the authentication target is not detected from the blurred image (the step S102: NO), the processing may be started from the step S101 again.

On the other hand, when the authentication target is detected from the blurred image (the step S102: YES), the switching unit 120 gives an instruction of filter switching to the filter switching unit 22 to switch the blur imaging to the normal imaging (step S103). Thereafter, the authentication unit 130 acquires the normal image captured by the normal imaging (step S104). Then, the authentication unit 130 performs the authentication processing of authenticating the authentication target, on the basis of the acquired normal image (step S105).

Specific Application Example

Figure 5:
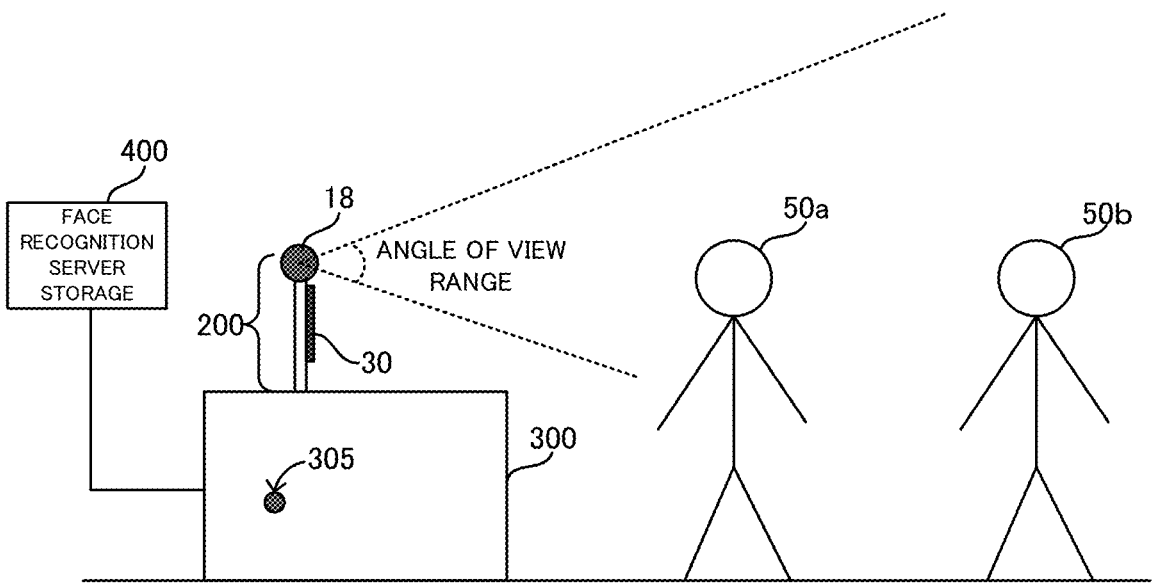
FIG. 5 is a side view illustrating a specific application example by the authentication system according to the first example embodiment.
Figure 6:
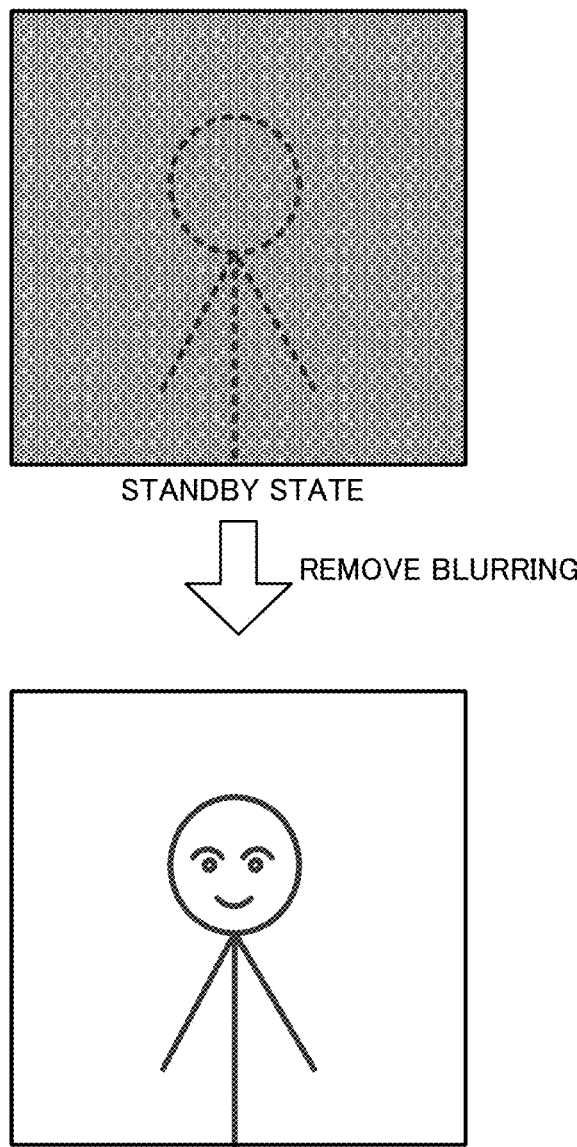
FIG. 6 is a plan view illustrating an example of a blurred image and a normal image captured by the authentication system according to the first example embodiment.
Figure 7:
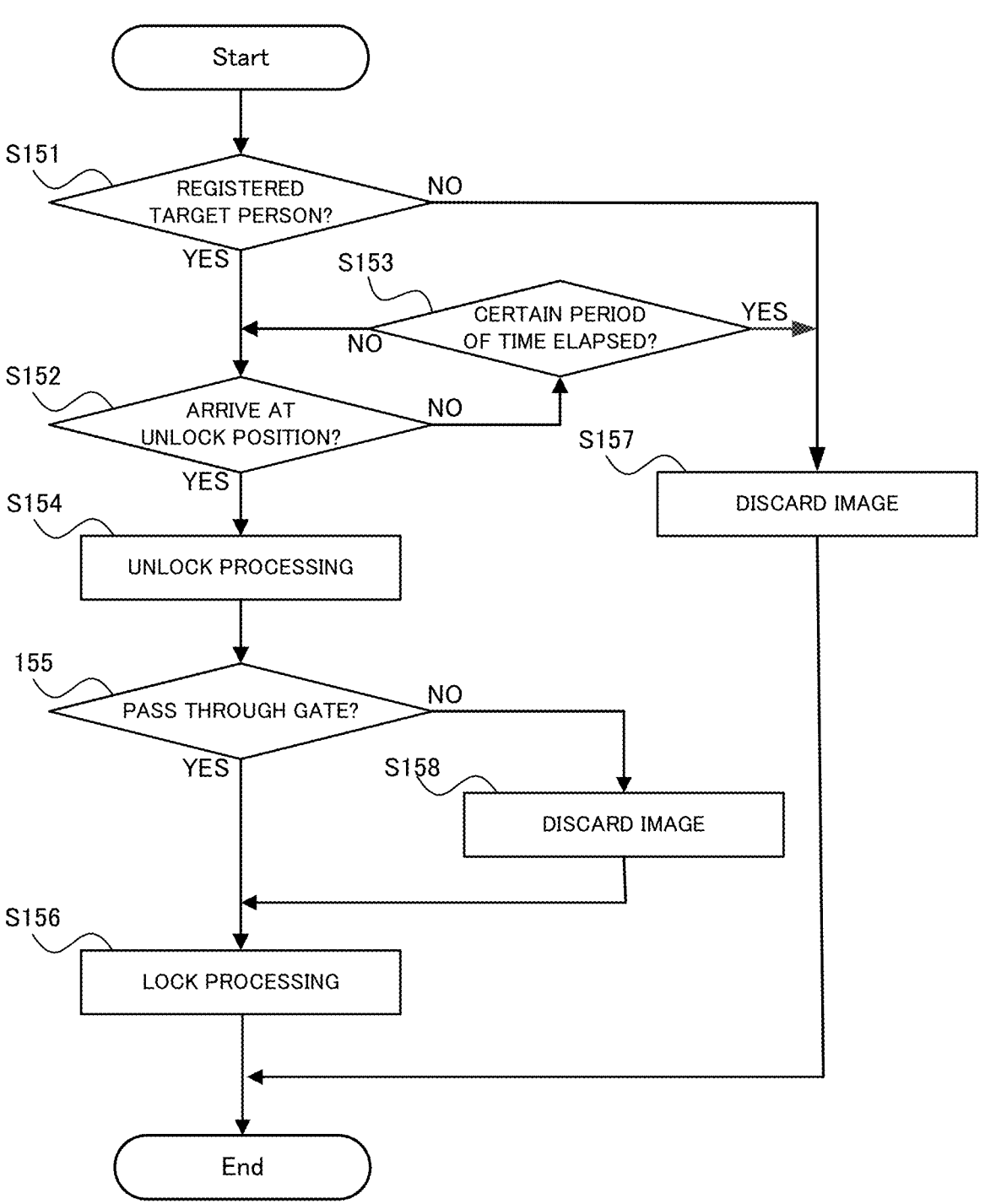
FIG. 7 is a flowchart illustrating an example of a flow of authentication processing by the authentication system according to the first example embodiment.

Next, a specific application example of the authentication system 10 according to the first example embodiment will be described with reference to FIG. 5 to FIG. 7. FIG. 5 is a side view illustrating the specific application example of the authentication system according to the first example embodiment. FIG. 6 is a plan view illustrating an example of the blurred image and the normal image captured by the authentication system according to the first example embodiment. FIG. 7 is a flowchart illustrating an example of a flow of the authentication processing by the authentication system according to the first example embodiment.

As illustrated in FIG. 5, the authentication system 10 according to the first example embodiment may be configured as a system that performs the authentication processing in a walk-through gate. The camera 18 here is configured to be included in a face recognition terminal 200 mounted on a gate 300. In this instance, the cameras 18 images a face of an authentication target 50 who is about to pass through the gate 300. The image captured by the camera 18 is displayed toward the authentication target 50 by a monitor provided in the face recognition terminal 200. The gate 300 includes a passage confirmation sensor 305 for confirming that the target 50 passes through the gate 300. In addition, data such as the image acquired by the face recognition terminal 200 are configured to be outputted to a face recognition server storage 400.

As illustrated in FIG. 6, the camera 18 performs the blur imaging in a standby state (i.e., a state where the authentication processing is not being performed). The image captured in the blur imaging is an image from which the presence of the authentication target is detectable, but details such as the face of the target may be hardly determined. In other words, the privacy of the target is protected. On the other hand, when the presence of the authentication target is detected and it becomes in an authentication state (i.e., a state where the authentication processing is performed), the blur imaging is switched to the normal imaging, as described above. Therefore, the normal image captured by the camera 18 is sharp/clear (i.e., the image that allows the authentication processing to be performed thereon). Hereinafter, a specific example of the authentication processing here (i.e., the step S105 in FIG. 4) will be described.

As illustrated in FIG. 7, when the authentication processing is started, first, the authentication unit 130 determines whether or not the authentication target captured in the normal image is a registered target person (step S151). That is, it is determined whether or not the authentication target is registered as a user who may pass through the gate 300. When the authentication target is not a registered target person (the step S151: NO), the image acquired for authentication (i.e., the normal image) is discarded (step S157), and a series of operation steps may be ended.

When the authentication target is a registered target person (the step S151: YES), the authentication unit 130 determines whether or not the authentication target arrives at an unlock position of the gate 300 (step S152). Whether or not the authentication target arrives at the unlock position may be determined, for example, on the basis of a distance between eyes of the authentication target in the normal image. When the authentication target does not arrive at the unlock position of the gate 300 (the step S152: NO), while a certain period of time has not elapsed since the authentication target is determined to be a registered target (step S153: NO), whether or not the authentication target arrives at the unlock position repeatedly determined. On the other hand, when a certain period of time has elapsed since the authentication target is determined to be a registered target (the step S153: YES), the image acquired for authentication may be discarded (the step S157), and a series of operation steps may be ended.

When the authentication target arrives at the unlock position of the gate 300 (the step S152: YES), the authentication unit 130 performs unlock processing of unlocking the gate 300 (step S154). Thereafter, when it is confirmed that the authentication target passes through the gate 300 by the passage confirmation sensor 305 (step S155: YES), the authentication unit 130 performs lock processing of locking the gate 300 (step S156). Even if the unlock processing is performed, when the authentication target does not pass through the gate 300 (the step S155: NO), the authentication unit 130 determines that the authentication target returns halfway, for example, and discards the image acquired for authentication (step S158), and performs the lock processing of locking the gate 300 (the step S156).

Technical Effect

Next, a technical effect obtained by the authentication system 10 according to the first example embodiment will be described.

As described in FIG. 1 to FIG. 7, in the authentication system 10 according to the first example embodiment, the blur imaging is performed until the presence of the authentication target is detected, and switching to the normal imaging is performed when the presence of the authentication target is detected. In this way, for example, it is possible to prevent the normal imaging (i.e., imaging without blurring) from being performed on a user who does not intend to be authenticated. Therefore, it is possible to properly perform the authentication processing on the authentication target in consideration of the privacy of each user.

Second Example Embodiment

The authentication system 10 according to a second example embodiment will be described with reference to FIG. 8. The second example embodiment is partially different from the first example embodiment only in the operation, and may be the same as the first example embodiment in the other parts. For this reason, a part that is different from the first example embodiment described above will be described in detail below, and a description of other overlapping parts will be omitted as appropriate.

(Flow of Operation)

First, with reference to FIG. 8, a flow of operation of the authentication system 10 according to the second example embodiment will be described. FIG. 8 is a flowchart illustrating the flow of the operation by the authentication system according to the second example embodiment. In FIG. 8, the same steps as those illustrated in FIG. 4 carry the same reference numerals.

Figure 8:
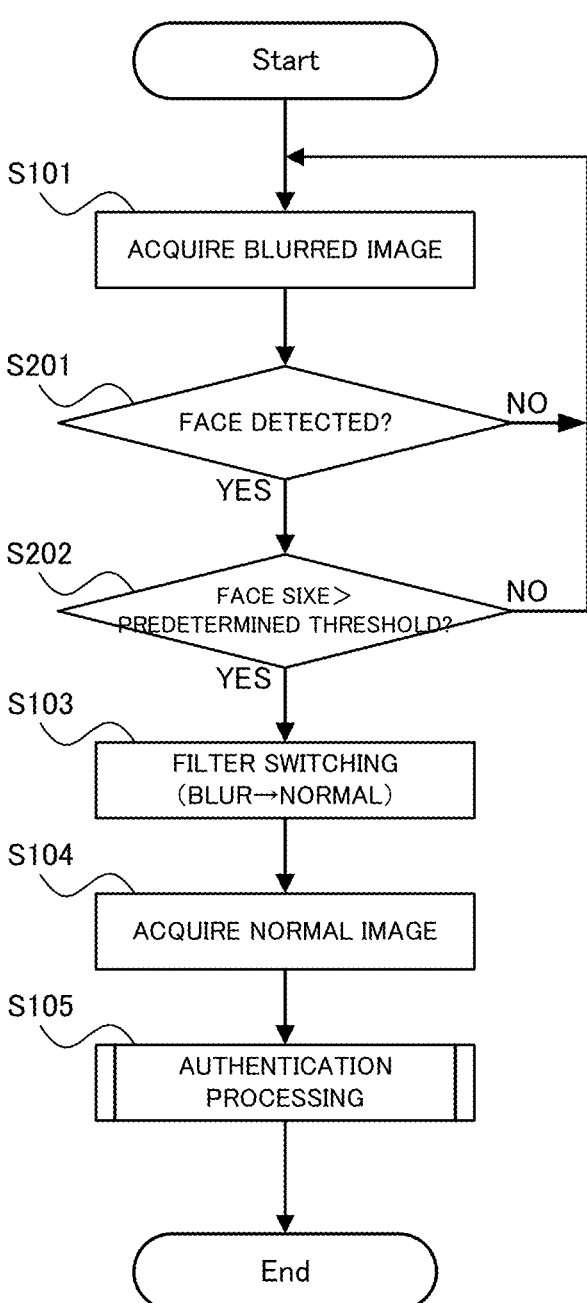
FIG. 8 is a flowchart illustrating a flow of operation by an authentication system according to a second example embodiment.

As illustrated in FIG. 8, when the operation of the authentication system 10 according to the second example embodiment is started, first, the target detection unit 110 acquires the blurred image captured by the blur imaging (step S101). Then, the target detection unit 110 detects the face from the acquired blurred image (step S201). Although a face detection method here is not particularly limited, a detailed position and shape of the face may not be detected. The detection of the face may be performed by skeletal detection, for example. When the face is not detected from the blurred image (the step S201: NO), the processing may be started from the step S101 again.

On the other hand, when the face is detected from the blurred image (the step S201: YES), the target detection unit 110 further determines whether or not a size of the detected face is greater than a predetermined threshold (step S202). The size of the face may be determined from the blurred image. The predetermined threshold here is set as a threshold for determining whether a user whose face is detected is approaching the camera 18 with an intention to be authenticated. For example, when the size of the face is greater than the predetermined threshold, it may be determined that the user intends to be authenticated (i.e., the user is the authentication target) as the user is clearly approaching the camera 18. On the other hand, when the size of the face is less than the predetermined threshold, it may be determined that the user merely passes near the camera and it cannot be said that the user intends to be authenticated (i.e., the user is not the authentication target at the moment). When it is determined that the size of the detected face is less than the predetermined threshold (the step S202: NO), the processing may be started from the step S101.

On the other hand, when it is determined that the size of the detected face is greater than the predetermined threshold (the step S202: YES), the switching unit 120 gives an instruction of filter switching to the filter switching unit 22 to switch the blur imaging to the normal imaging (step S103). Thereafter, the authentication unit 130 acquires the normal image captured by the normal imaging (step S104). Then, the authentication unit 130 performs the authentication processing of authenticating the authentication target, on the basis of the acquired normal image (step S105).

Technical Effect

Next, a technical effect obtained by the authentication system 10 according to the second example embodiment will be described.

As described in FIG. 8, in the authentication system 10 according to the second example embodiment, the face is detected from the blurred image, and the blur imaging is switched to the normal imaging on the basis of the size of the detected face. In this way, for example, it is possible to prevent the normal imaging from being performed on the user who does not intend to be authenticated. Therefore, it is possible to properly perform the authentication processing on the authentication target in consideration of the privacy of each user.

Third Example Embodiment

The authentication system 10 according to a third example embodiment will be described with reference to FIG. 9. The third example embodiment is partially different from the first and second example embodiments only in the operation, and may be the same as the first and second example embodiments in the other parts. For this reason, a part that is different from each of the example embodiments described above will be described in detail below, and a description of other overlapping parts will be omitted as appropriate.
(Flow of Operation)

First, with reference to FIG. 9, a flow of operation of the authentication system 10 according to the third example embodiment will be described. FIG. 9 is a flowchart illustrating the flow of the operation by the authentication system according to the third example embodiment. In FIG. 9, the same steps as those illustrated in FIG. 4 carry the same reference numerals.

Figure 9:
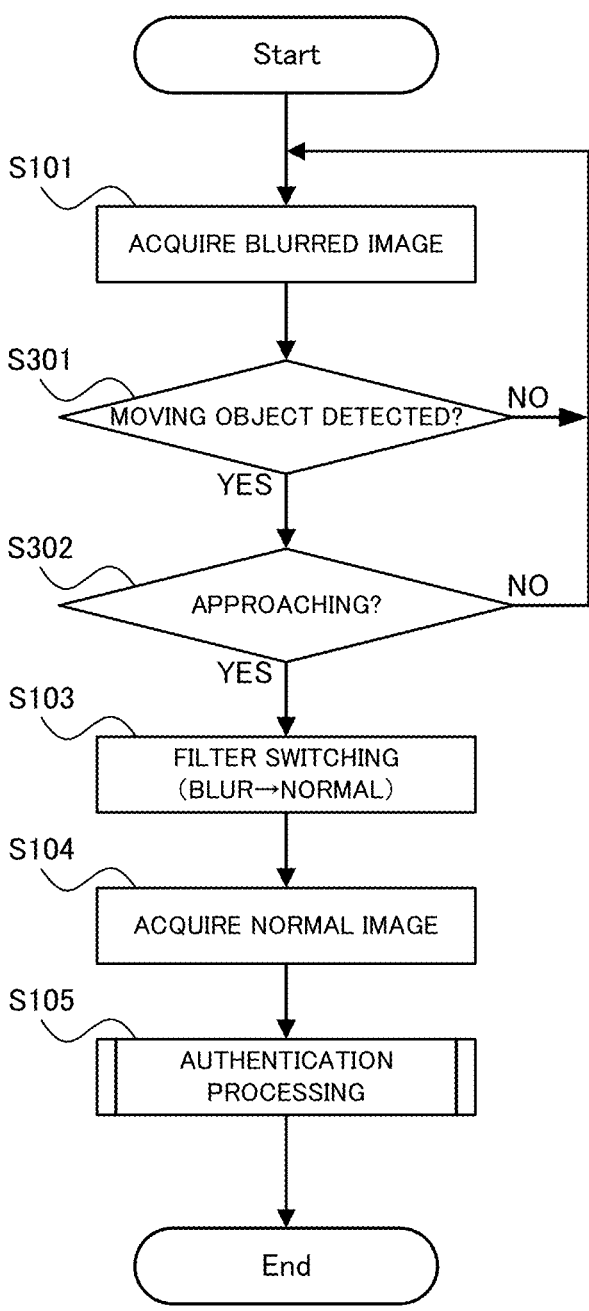
FIG. 9 is a flowchart illustrating a flow of operation by an authentication system according to a third example embodiment.

As illustrated in FIG. 9, when the operation of the authentication system 10 according to the third example embodiment is started, first, the target detection unit 110 acquires the blurred image captured by the blur imaging (step S101). Then, the target detection unit 110 detects a moving object from the acquired blurred image (step S301). Although a detection method here is not particularly limited, the moving object may be detected from a difference between consecutive frames, for example. When the moving object is not detected from the blurred image (the step S301: NO), the processing may be started from the step S101 again.

On the other hand, when the moving object is detected from the blurred image (the step S301: YES), the target detection unit 110 further determines whether the detected moving object is approaching the camera 18 (step S302). This determination may be realized by flow line analysis, for example. When it is determined that the moving object is not approaching the camera 18 (the step S302: NO), it may be determined that the user merely passes near the camera and it cannot be said that the user intends to be authenticated (i.e., the user is not the authentication target at the moment). Thus, the processing may be started from the step S101 again.

On the other hand, when it is determined that the moving object is approaching the camera 18 (the step S302: YES), it may be determined that the user intends to be authenticated (i.e., the user is the authentication target). Thus, the switching unit 120 gives an instruction of filter switching to the filter switching unit 22 to switch the blur imaging to the normal imaging (step S103). Thereafter, the authentication unit 130 acquires the normal image captured by the normal imaging (step S104). At this time, the authentication unit 130 may perform processing of detecting a face of the moving object from the normal image. Then, the authentication unit 130 performs the authentication processing of authenticating the authentication target, on the basis of the acquired normal image (step S105).

Technical Effect

Next, a technical effect obtained by the authentication system 10 according to the third example embodiment will be described.

As described in FIG. 9, in the authentication system 10 according to the third example embodiment, the moving object is detected from the blurred image, and in a case where the object is approaching the camera 18, the blur imaging is switched to the normal imaging. In this way, for example, it is possible to prevent the normal imaging from being performed on the user who does not intend to be authenticated. Therefore, it is possible to properly perform the authentication processing on the authentication target in consideration of the privacy of each user.

Fourth Example Embodiment

The authentication system 10 according to a fourth example embodiment will be described with reference to FIG. 10 and FIG. 11. The fourth example embodiment is partially different from the first to third example embodiments only in the operation, and may be the same as the first to third example embodiments in the other parts. For this reason, a part that is different from each of the example embodiments described above will be described in detail below, and a description of other overlapping parts will be omitted as appropriate.

(Flow of Operation)

First, with reference to FIG. 10, a flow of operation of the authentication system 10 according to the fourth example embodiment will be described. FIG. 10 is a flowchart illustrating the flow of the operation by the authentication system according to the fourth example embodiment. In FIG. 10, the same steps as those illustrated in FIG. 4 carry the same reference numerals.

Figure 10:
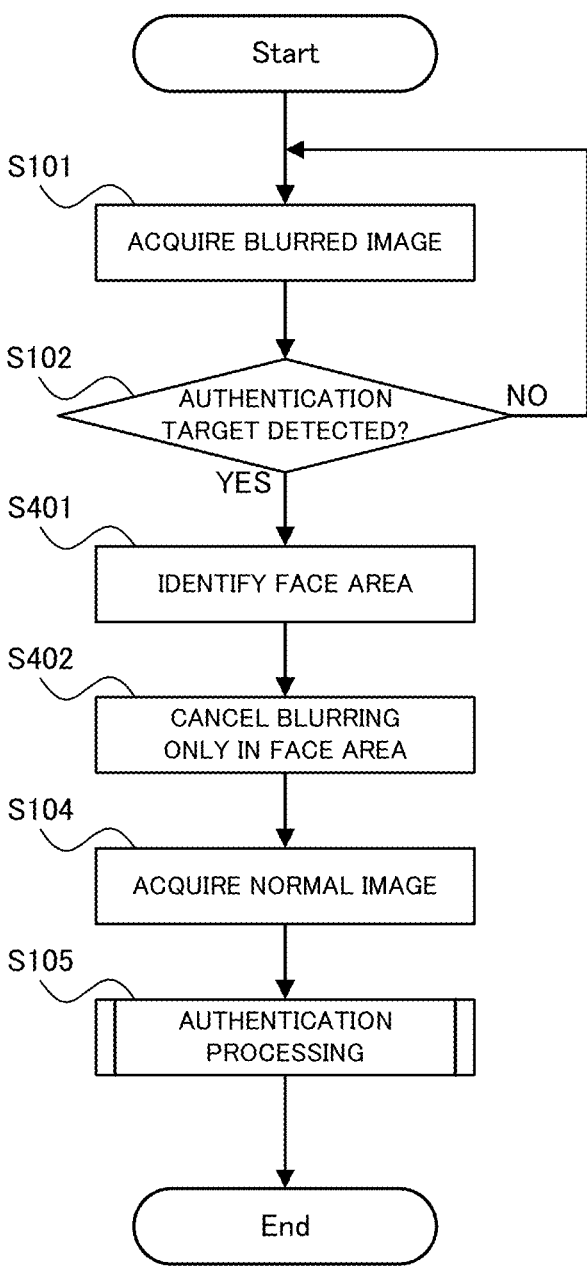
FIG. 10 is a flowchart illustrating a flow of operation by an authentication system according to a fourth example embodiment.

As illustrated in FIG. 10, when the operation of the authentication system 10 according to the fourth example embodiment is started, first, the target detection unit 110 acquires the blurred image captured by the blur imaging (step S101). Then, the target detection unit 110 detects the presence of the authentication target on the basis of the acquired blurred image (step S102). When the authentication target is not detected from the blurred image (the step S102: NO), the processing may be started from the step S101 again.

On the other hand, when the authentication target is detected from the blurred image (the step S102: YES), the target detection unit 110 identifies a face area of the authentication target (i.e., an area in which there is the face of the authentication target) from the blurred image (step S401). Then, the switching unit 120 according to the present example embodiment switches the blur imaging to the normal imaging only in the identified face area (step S402). In other words, the blur imaging remains in an area other than the face area. Thereafter, the authentication unit 130 acquires the normal image captured by the normal imaging (step S104). Then, the authentication unit 130 performs the authentication processing of authenticating the authentication target, on the basis of the acquired normal image (step S105).

(Blurring Cancellation in Face Area)

Next, with reference to FIG. 11, an example of a case where the blurring is canceled only in the face area, as described above, will be described. FIG. 11 is a plan view illustrating an example of the blurred image and the normal image captured by the authentication device according to the fourth example embodiment.

Figure 11:
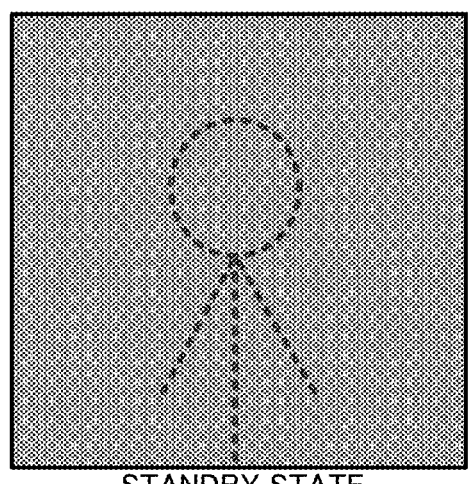
FIG. 11 is a plan view illustrating an example of the blurred image and the normal image captured by the authentication system according to the fourth example embodiment.
Figure 11:
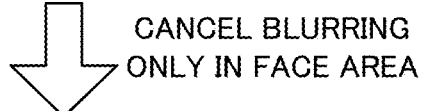
Figure 11:
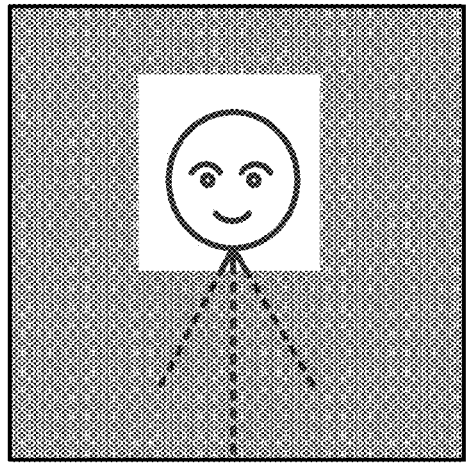

As illustrated in FIG. 11, the camera 18 performs the blur imaging in the standby state (i.e., the state where the authentication processing is not being performed). In the present example embodiment, when the presence of the authentication target is detected and it becomes in the authentication state (i.e., the state where the authentication processing is performed), the blur imaging is switched to the normal imaging only in the face area of the authentication target, as described above. Therefore, the image captured by the camera 18 is sharp/clear only in the face area (i.e., the image that allows the authentication processing to be performed thereon), and remains blurred/unclear in an area other than the face area.

As described above, even when the normal imaging is set to be performed only in the face area, it is possible to normally perform the face recognition, for example. In a case where it is desired to perform authentication using the area other than the face, the blur imaging may be switched to the normal imaging only in the other area used for authentication, instead of the face area.

Technical Effect

Next, a technical effect obtained by the authentication system 10 according to the fourth example embodiment will be described.

As described in FIG. 10 and FIG. 11, in the authentication system 10 according to the fourth example embodiment, the blur imaging is switched to the normal imaging only in the face of the authentication target. In this way, the entire image is not necessarily sharp/clear in the authentication. Therefore, it is possible to properly perform the authentication processing on the authentication target in consideration of the privacy of another user who is captured behind the authentication target (i.e., the area other than the face area of the authentication target), for example.

Fifth Example Embodiment

The authentication system 10 according to a fifth example embodiment will be described with reference to FIG. 12 and FIG. 13. The fifth example embodiment is partially different from the fourth example embodiment only in the operation, and may be the same as the first to fourth example embodiments in the other parts. For this reason, a part that is different from each of the example embodiments described above will be described in detail below, and a description of other overlapping parts will be omitted as appropriate.

(Flow of Operation)

First, with reference to FIG. 12, a flow of operation of the authentication system 10 according to the fifth example embodiment will be described. FIG. 12 is a flowchart illustrating the flow of the operation by the authentication system according to the fifth example embodiment. In FIG. 12, the same steps as those illustrated in FIG. 10 carry the same reference numerals.

Figure 12:
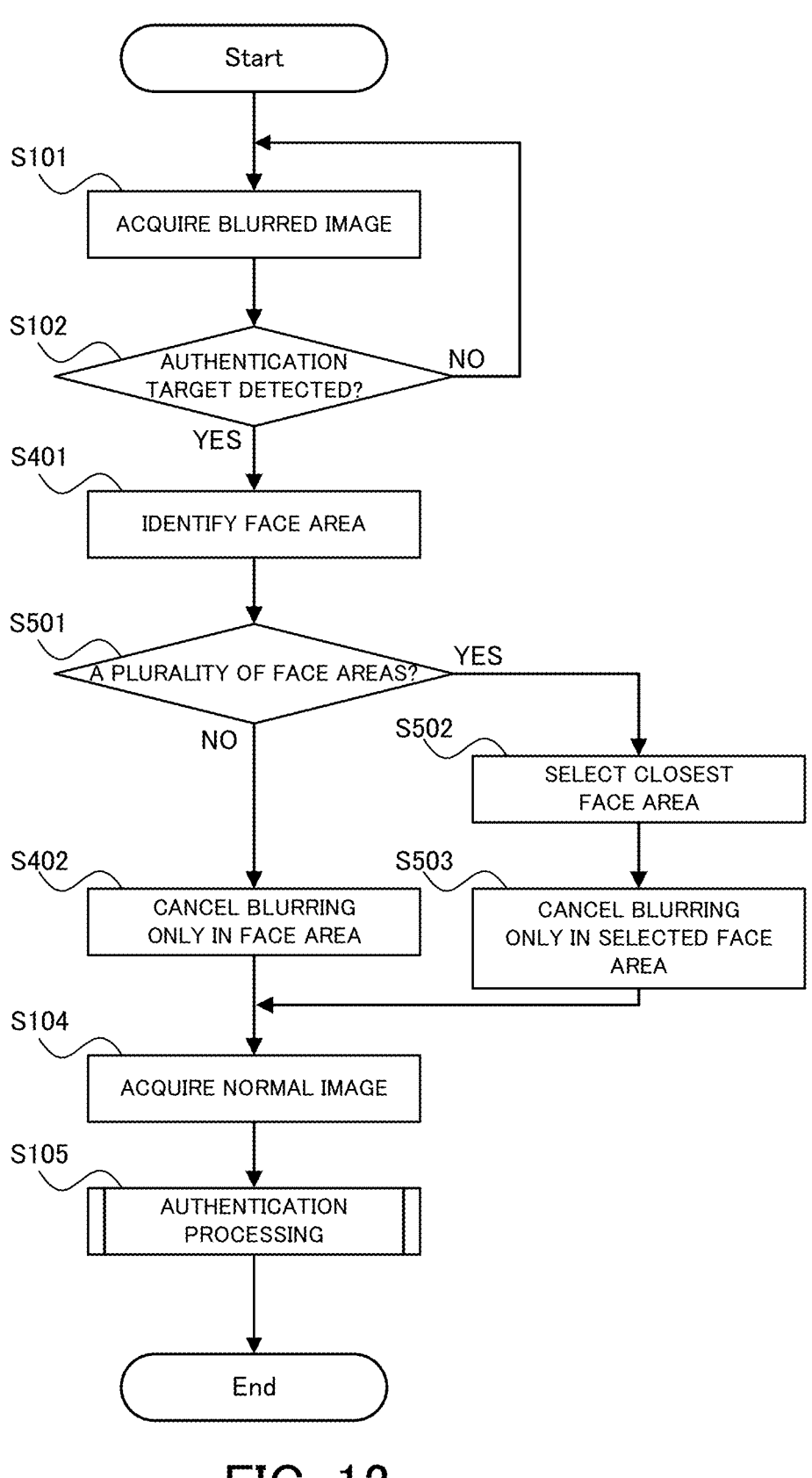
FIG. 12 is a flowchart illustrating a flow of operation by an authentication system according to a fifth example embodiment.

As illustrated in FIG. 12, when the operation of the authentication system 10 according to the fifth example embodiment is started, first, the target detection unit 110 acquires the blurred image captured by the blur imaging (step S101). Then, the target detection unit 110 detects the presence of the authentication target on the basis of the acquired blurred image (step S102). When the authentication target is not detected from the blurred image (the step S102: NO), the processing may be started from the step S101 again.

On the other hand, when the authentication target is detected from the blurred image (the step S102: YES), the target detection unit 110 identifies the face area of the authentication target from the blurred image (step S401). Thereafter, the target detection unit 110 determines whether or not there are a plurality of face areas in the blurred image (step S501). When it is determined that there are not a plurality of face areas in the blurred image (i.e., only one face area is identified) (the step S501: NO), the switching unit 120 switches the blur imaging to the normal imaging only in the identified face area (step S402).

On the other hand, when there are a plurality of face areas in the blurred image (the step S501: YES), the target detection unit 110 selects the face area closest to the camera 18 (step S502). The face area closest to the camera 18 may be determined, for example, on the basis of a size of the face area in the blurred image. Then, the switching unit 120 switches the blur imaging to the normal imaging only in the selected face area (step S503). In other words, the blur imaging remains in the face area of another user other than a user in the front.

Thereafter, the authentication unit 130 acquires the normal image captured by the normal imaging (step S104). Then, the authentication unit 130 performs the authentication processing of authenticating the authentication target, on the basis of the acquired normal image (step S105).

(Blurring Cancellation in Face Area)

Next, with reference to FIG. 13, an example of a case where the blurring is canceled only in the face area of the user in the front, as described above, will be described. FIG. 13 is a plan view illustrating an example of the blurred image and the normal image captured by the authentication device according to the fifth example embodiment.

Figure 13:
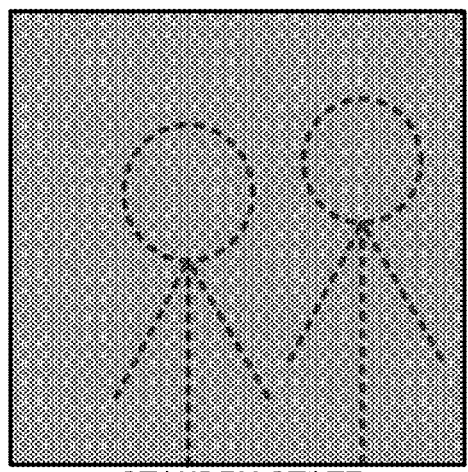
FIG. 13 is a plan view illustrating an example of the blurred image and the normal image captured by the authentication system according to the fifth example embodiment.
Figure 13:
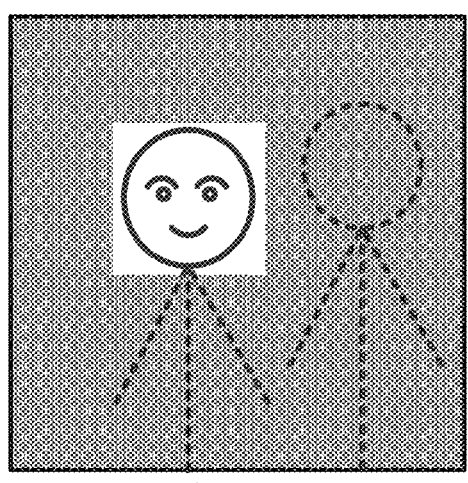

As illustrated in FIG. 13, the camera 18 performs the blur imaging in the standby state (i.e., the state where the authentication processing is not being performed). In the present example embodiment, when the presence of the authentication target is detected and it becomes in the authentication state (i.e., the state where the authentication processing is performed), the blur imaging is switched to the normal imaging only in the face area of the authentication target in the front and is closest to the camera, as described above. Therefore, the image captured by the camera 18 is sharp/clear only in the face area of the user in the front (i.e., the image that allows the authentication processing to be performed thereon), and remains blurred/unclear in an area other than that. The blur imaging may be switched to the normal imaging in areas, other than the face area, of another user who is not in the front. In this case, the blur imaging is performed, even in the authentication state, only in the face area of the other user who is not in the front.

In a case where a plurality of users are captured in the camera, a first target on which the authentication processing is to be performed, is considered to be a user closest to the camera 18. Therefore, it is not particularly problematic even if the blur imaging remains in the face area of another user other than the user in the front. For another user other than the user in the front, the authentication processing may be performed after the authentication processing of authenticating the user in the front is ended and the user in the front goes away. That is, for another user other than the user in the front, the authentication processing may be performed when the other user is in the front.

Technical Effect

Next, a technical effect obtained by the authentication system 10 according to the fifth example embodiment will be described.

As described in FIG. 12 and FIG. 13, in the authentication system 10 according to the fifth example embodiment, the blur imaging may be switched to the normal imaging only for the face of the authentication target in the front. In this way, the entire image is not necessarily sharp/clear in the authentication. Therefore, it is possible to properly perform the authentication processing on the authentication target in consideration of the privacy of another user who is behind the authentication target in the front, for example.

Sixth Example Embodiment

The authentication system 10 according to a sixth example embodiment will be described with reference to FIG. 14. The sixth example embodiment is partially different from the first to fifth example embodiments only in the operation, and may be the same as the first to fifth example embodiments in the other part. For this reason, a part that is different from each of the example embodiments described above will be described in detail below, and a description of other overlapping parts will be omitted as appropriate.

(Flow of Operation)

First, with reference to FIG. 14, a flow of the operation of the authentication system 10 according to the sixth example embodiment will be described. FIG. 14 is a flowchart illustrating the flow of the operation by the authentication system according to the sixth example embodiment. In FIG. 14, the same steps as those illustrated in FIG. 4 carry the same reference numerals.

Figure 14:
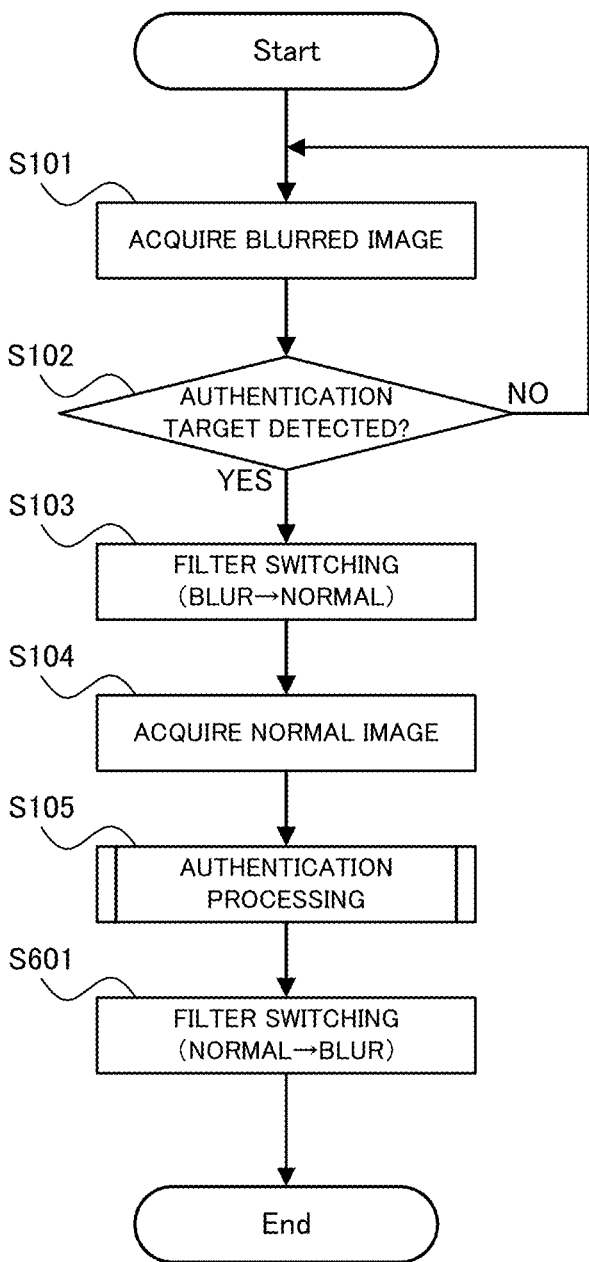
FIG. 14 is a flowchart illustrating a flow of operation by an authentication system according to a sixth example embodiment.

As illustrated in FIG. 14, when the operation of the authentication system 10 according to the sixth example embodiment is started, first, the target detection unit 110 acquires the blurred image captured by the blur imaging (step S101). Then, the target detection unit 110 detects the presence of the authentication target on the basis of the acquired blurred image (step S102). When the authentication target is not detected from the blurred image (the step S102: NO), the processing may be started from the step S101 again.

On the other hand, when the authentication target is detected from the blurred image (the step S102: YES), the switching unit 120 gives an instruction of filter switching to the filter switching unit 22 to switch the blur imaging to the normal imaging (step S103). Thereafter, the authentication unit 130 acquires the normal image captured by the normal imaging (step S104). Then, the authentication unit 130 performs the authentication processing of authenticating the authentication target, on the basis of the acquired normal image (step S105).

Subsequently, especially in the present example embodiment, the switching unit 120 gives an instruction of filter switching to the filter switching unit 22 to switch the blur imaging to the normal imaging (step S601). Therefore, after the authentication processing of authenticating the authentication target is performed, the blur imaging is performed again. By this, the sharp/clear normal image may not be acquired, but it is not particularly problematic because the authentication processing of authenticating the authentication target is already ended. In a case where a new authentication target is detected, the blur imaging may be switched to the normal imaging.

Technical Effect

Next, a technical effect obtained by the authentication system 10 according to the sixth example embodiment will be described.

As described in FIG. 14, in the authentication system 10 according to the sixth example embodiment, when the authentication processing of authenticating the authentication target is ended, the normal imaging is switched to the blur imaging. In this way, it is possible to reduce a time for the normal imaging (to limit the normal imaging only at the timing when the authentication processing is performed). Therefore, it is possible to protect the privacy of the user who is not the authentication target, more properly.

Seventh Example Embodiment

The authentication system 10 according to a seventh example embodiment will be described with reference to FIG. 15. The seventh example embodiment is partially different from the first to sixth example embodiments only in the operation, and may be the same as the first to sixth example embodiments in the other parts. For this reason, a part that is different from each of the example embodiments described above will be described in detail below, and a description of other overlapping parts will be omitted as appropriate.

(Gradual Blurring Cancellation)

First, with reference to FIG. 15, gradual blurring cancellation performed in the authentication system 10 according to the seventh example embodiment will be described. FIG. 15 is a plan view illustrating an example of the image captured while sharpness is gradually increased in an authentication system according to a seventh example embodiment.

Figure 15:
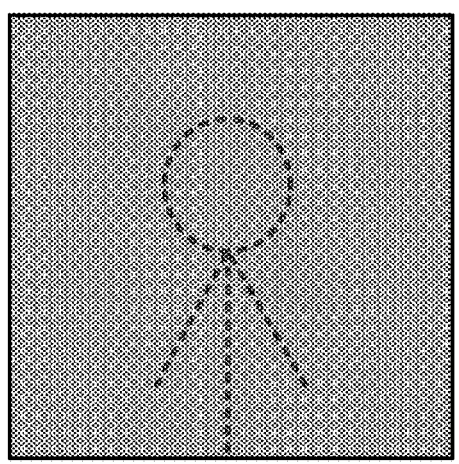
FIG. 15 is a plan view illustrating an example of the image captured while sharpness is gradually increased in an authentication system according to a seventh example embodiment.
Figure 15:
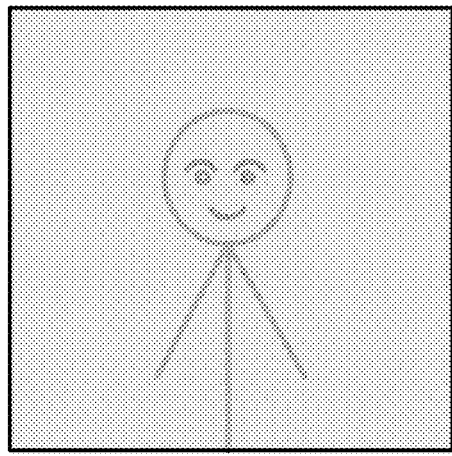
Figure 15:
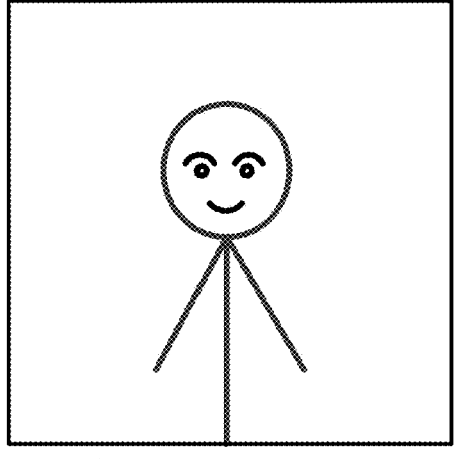

As illustrated in FIG. 15, in the authentication system 10 according to the seventh example embodiment, when the authentication target is detected and the blur imaging is switched to the normal imaging, the sharpness is gradually increased. Specifically, the sharpness is gradually increased in accordance with a distance between the authentication target and the camera 18. In the example illustrated in the figure, in a case where the authentication target is not detected, an image with "strong" blurring and low sharpness is acquired. Then, when the authentication target is detected, an image with "weak" blurring and medium sharpness is acquired. Furthermore, as the authentication target approaches the camera 18, an image with "off" blurring and high sharpness is acquired.

Here, an example in which the sharpness is gradually increased, but the sharpness may be linearly increased. In addition, in a case where the distance between the authentication target and the camera 18 is too far (e.g., in a case where the authentication target returns halfway), the sharpness may be reduced in accordance with the distance. In a case where the authentication target is too far away to identify the face, the blurring may be set to "off" to increase the sharpness.

The processing of increasing the sharpness described above may be performed regardless of the authentication processing. For example, the sharpness may be gradually increased in accordance with only the distance between the authentication target and the camera 18, regardless of whether or not the authentication processing is successful. Alternatively, the processing of increasing the sharpness may be performed in cooperation with the authentication processing. For example, the sharpness may be gradually increased until the authentication processing succeeds, and the processing of increasing the sharpness may be stopped at the timing when the authentication processing succeeds.

Technical Effect

Next, a technical effect obtained by the authentication system 10 according to the seventh example embodiment will be described.

As described in FIG. 15, in the authentication system 10 according to the seventh example embodiment, when the blur imaging is switched to the normal imaging, the sharpness is controlled to be gradually increased. In this way, since it is possible to prevent the sharpness from being suddenly increased immediately after the authentication target is detected, it is possible to protect the privacy of another user other than the user who is the target to be authenticated, more properly. For example, even if the user who actually does not intend to be authenticated is detected as the authentication target, an image with high sharpness is not immediately acquired, and it is thus possible to properly protect the privacy.

Eighth Example Embodiment

The authentication system 10 according to the eighth example embodiment will be described with reference to FIG. 16 and FIG. 17. The eighth example embodiment is partially different from the first to seventh example embodiments only in the configuration and operation, and may be the same as the first to seventh example embodiments in the other parts. For this reason, a part that is different from each of the example embodiments described above will be described in detail below, and a description of other overlapping parts will be omitted as appropriate.

(Functional Configuration)

First, with reference to FIG. 16, a functional configuration of the authentication system according to the eighth example embodiment will be described. FIG. 16 is a block diagram illustrating the functional configuration of the authentication system according to the eighth example embodiment. In FIG. 16, the same components as those illustrated in FIG. 3 carry the same reference numerals.

Figure 16:
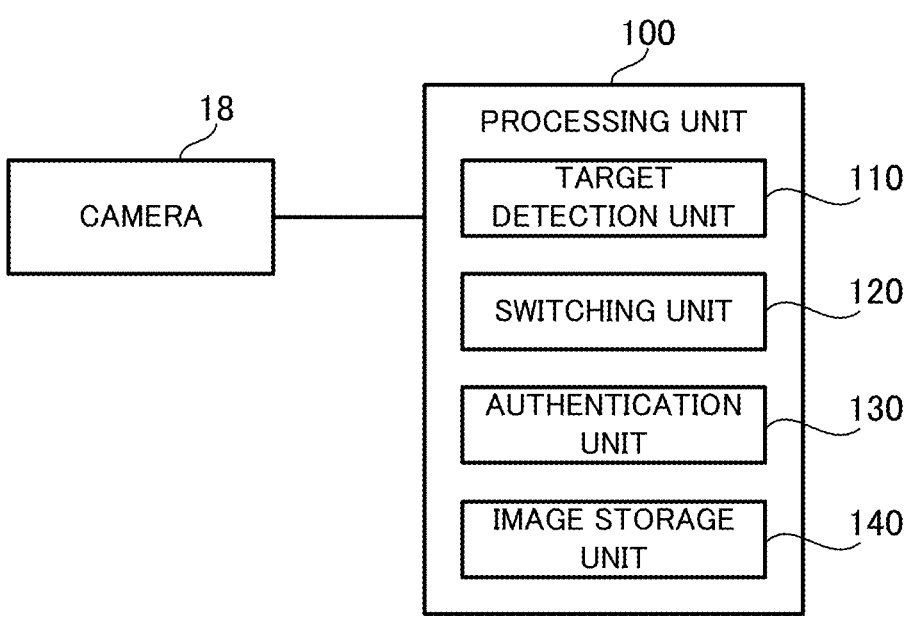
FIG. 16 is a block diagram illustrating a functional configuration of a authentication according to an eighth example embodiment.

As illustrated in FIG. 16, the authentication system 10 according to the eighth example embodiment o includes the camera 18 and the processing unit 100. Especially, the processing unit 100 according to the eighth example embodiment includes, as components for realizing the functions thereof, the target detection unit 110, the switching unit 120, the authentication unit 130, and an image storage unit 140. That is, the processing unit 100 according to the eighth example embodiment further includes the image storage unit 140, in addition to the configuration according to the first example embodiment (see FIG. 3). The image storage unit 140 may be realized by the storage apparatus 14 (see FIG. 1), for example.

The image storage unit 140 is configured to store the normal image captured by the camera 18. The image storage unit 140 may store all the normal images captured by the normal imaging or may store only the image that is used for the authentication processing out of the normal images. The image storage unit 140 may be configured to store the blurred image, in addition to the normal image. The image storage unit 140 is configured to determine whether or not to store the normal image in accordance with the authentication processing. Specifically, the image storage unit 140 stores the normal image when the authentication processing is successful, and does not store the normal image when the authentication processing is failed (i.e., discards the image). The image storage unit 140 may be configured to store the authentication results as a log.

(Flow of Operation)

Next, with reference to FIG. 17, a flow of operation of the authentication system 10 according to the eighth example embodiment will be described. FIG. 17 is a flowchart illustrating the flow of the operation by the authentication system according to the eighth example embodiment. In FIG. 17, the same steps as those illustrated in FIG. 4 carry the same reference numerals.

Figure 17:
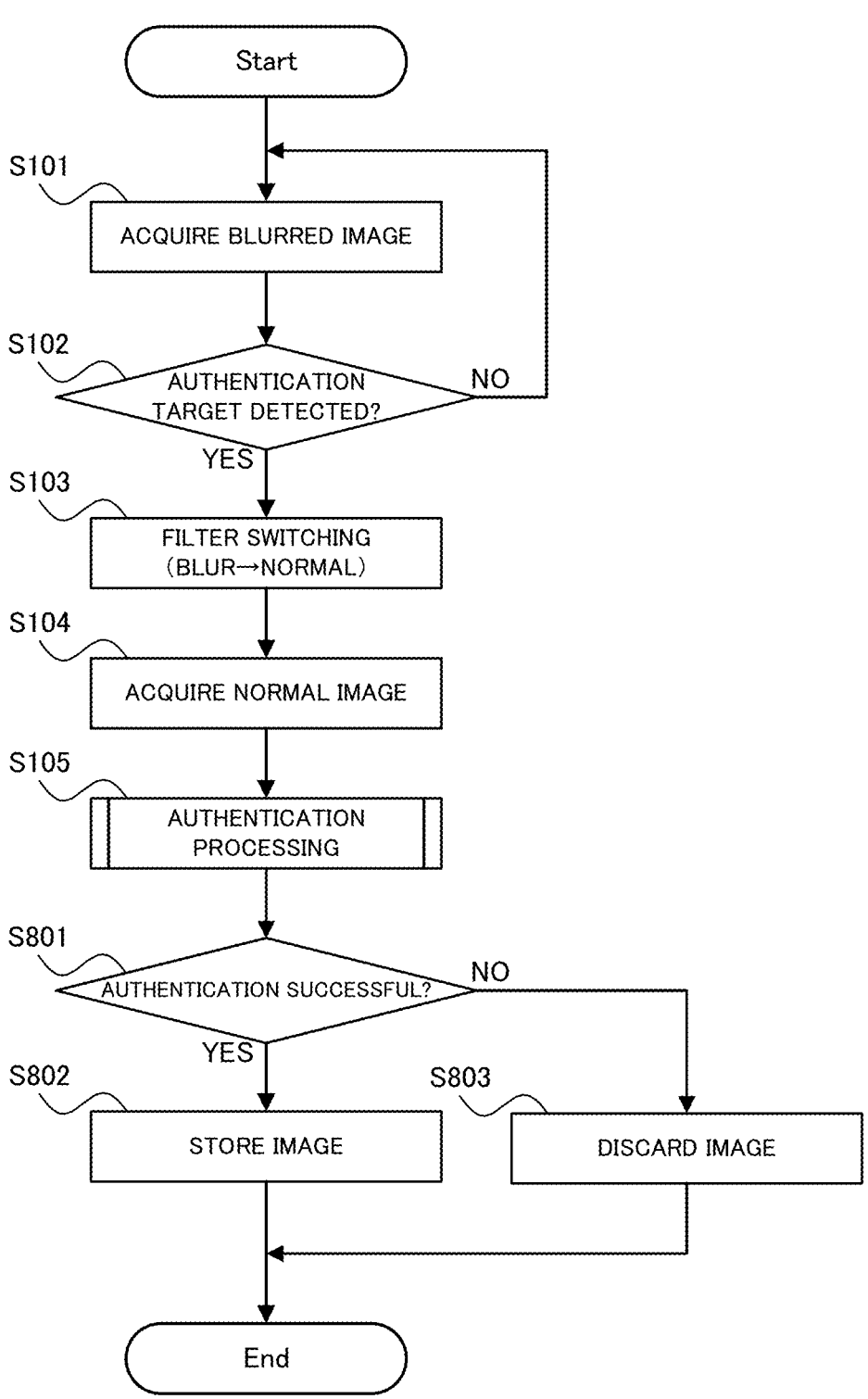
FIG. 17 is a flowchart illustrating a flow of operation by the authentication system according to the eighth example embodiment.

As illustrated in FIG. 17, when the operation of the authentication system 10 according to the eighth example embodiment is started, first, the target detection unit 110 acquires the blurred image captured by the blur imaging (step S101). Then, the target detection unit 110 detects the presence of the authentication target on the basis of the acquired blurred image (step S102). When the authentication target is not detected from the blurred image (the step S102: NO), the processing may be started from the step S101 again.

On the other hand, when the authentication target is detected from the blurred image (the step S102: YES), the switching unit 120 gives an instruction of filter switching to the filter switching unit 22 to switch the blur imaging to the normal imaging (step S103). Thereafter, the authentication unit 130 acquires the normal image captured by the normal imaging (step S104). Then, the authentication unit 130 performs the authentication processing of authenticating the authentication target, on the basis of the acquired normal image (step S105).

Subsequently, in the present example embodiment, it is determined whether or not the authentication processing by the authentication unit 130 is successful (step S801). When the authentication processing is successful (the step S801: YES), the image storage unit 140 stores the normal image of the authentication target for whom the authentication processing is successful (step S802). On the other hand, when the authentication processing is failed (the step S801: NO), the image storage unit 140 discards the normal image of the authentication target for whom the authentication processing is failed (step S803). When discarding the normal image, the image storage unit 140 may store the blurred image and configuration information about the authentication target.

As in the fourth and fifth example embodiments, when the blurring is cancelled in a part of the image in the imaging, the image storage unit 140 may perform image processing and store the image in which the blurring is entirely canceled, for the authentication target for whom the authentication processing is successful, and may store the image in which the blurring is partially canceled as it is, for the authentication target for whom the authentication processing is failed.

The user may also be notified in advance that the image is to be stored, so that the user may select whether or not to permit the image to be stored. In addition, the user may set to what extent the storage of the image is permitted. In this case, for example, settings such as "permitting the storage of an image in which only the face is clear" and "permitting the storage of an image with low sharpness", may be performed.

Technical Effect

Next, a technical effect obtained by the authentication system 10 according to the eighth example embodiment will be described.

As described in FIG. 16 and FIG. 17, in the authentication system 10 according to the eighth example embodiment, the normal image of the authentication target for whom the authentication processing is successful, is stored. In this way, the images stored in the past may be used to perform various tasks. For example, it is possible to confirm an authentication history in a case where a problem occurs at a later date or in similar cases.

Ninth Example Embodiment

The authentication system 10 according to the ninth example embodiment will be described with reference to FIG. 18 and FIG. 19. The ninth example embodiment is partially different from the first to eighth example embodiments only in the configuration and operation, and may be the same as the first to eighth example embodiments in the other parts. For this reason, a part that is different from each of the example embodiments described above will be described in detail below, and a description of other overlapping parts will be omitted as appropriate.
(Functional Configuration)

First, with reference to FIG. 18, a functional configuration of the authentication system 10 according to the ninth example embodiment will be described. FIG. 18 is a block diagram illustrating the functional configuration of the authentication system according to the ninth example embodiment. In FIG. 18, the same components as those illustrated in FIG. 3 carry the same reference numerals.

Figure 18:
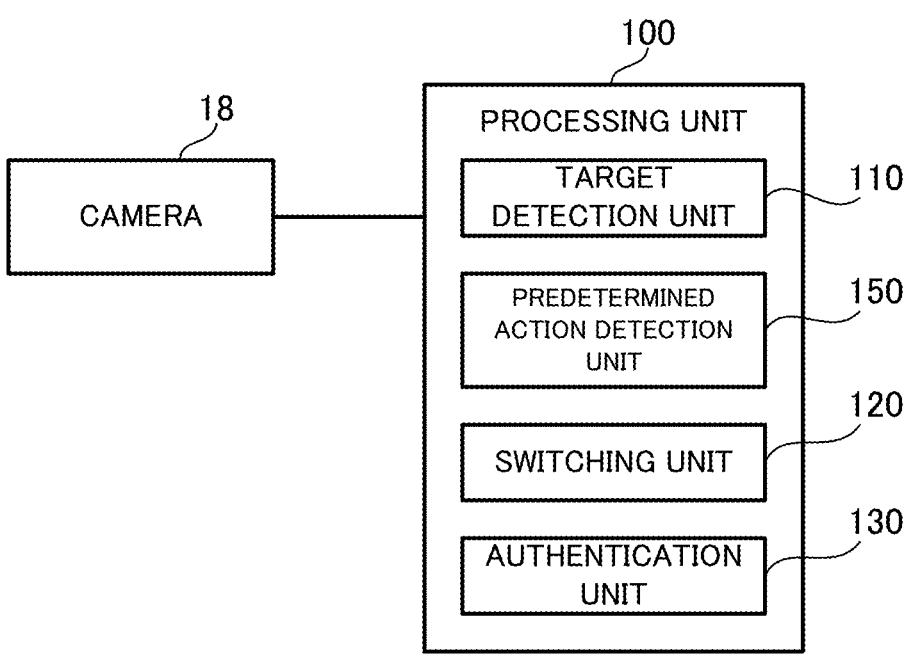
FIG. 18 is a block diagram illustrating a functional configuration of an authentication system according to a ninth example embodiment.

As illustrated in FIG. 18, the authentication system 10 according to the ninth example embodiment includes camera 18 and the processing unit 100. Especially, the processing unit 100 according to the ninth example embodiment includes, as components for realizing the functions thereof, the target detection unit 110, a predetermined action detection unit 150, the switching unit 120, and the authentication unit 130. That is, the processing unit 100 according to the ninth example embodiment further includes the predetermined action detection unit 150, in addition to the configuration according to the first example embodiment (see FIG. 3). The predetermined action detection unit 150 may be a functional block realized by the processor 11 (see FIG. 1), for example.

The predetermined action detection unit 150 is configured to detect a predetermined action by the authentication target. The predetermined action may be, for example, a gesture set in advance. The gesture may include a body gesture, a hand gesture, utterance, a direction of the face, stepping, and the like. Furthermore, the predetermined action may include a suspicious behavior. The suspicious behavior may be, for example, staying long in a predetermined area, sitting squat, leaving baggage, or the like. The predetermined action detection unit 150 may detect the predetermined action from the blurred image, or may detect the predetermined action by using a sensor or another camera. For example, the predetermined action detection unit 150 may determine by using a pressure sensor whether the target is following particular footprints. Alternatively, the predetermined action detection unit 150 may perform the determination by confirming a walking position from a whole image captured by a bird's eye view camera. In addition to or instead of the predetermined action, the predetermined action detection unit 150 may detect a smart tag, a smart device, a uniform, an armband, a chameleon code, or the like worn by the target.
(Flow of Operation)

Next, with reference to FIG. 19, a flow of operation of the authentication system 10 according to the ninth example embodiment will be described. FIG. 19 is a flowchart illustrating the flow of the operation of the authentication system according to the ninth example embodiment. In FIG. 19, the same steps as those illustrated in FIG. 4 carry the same reference numerals.

Figure 19:
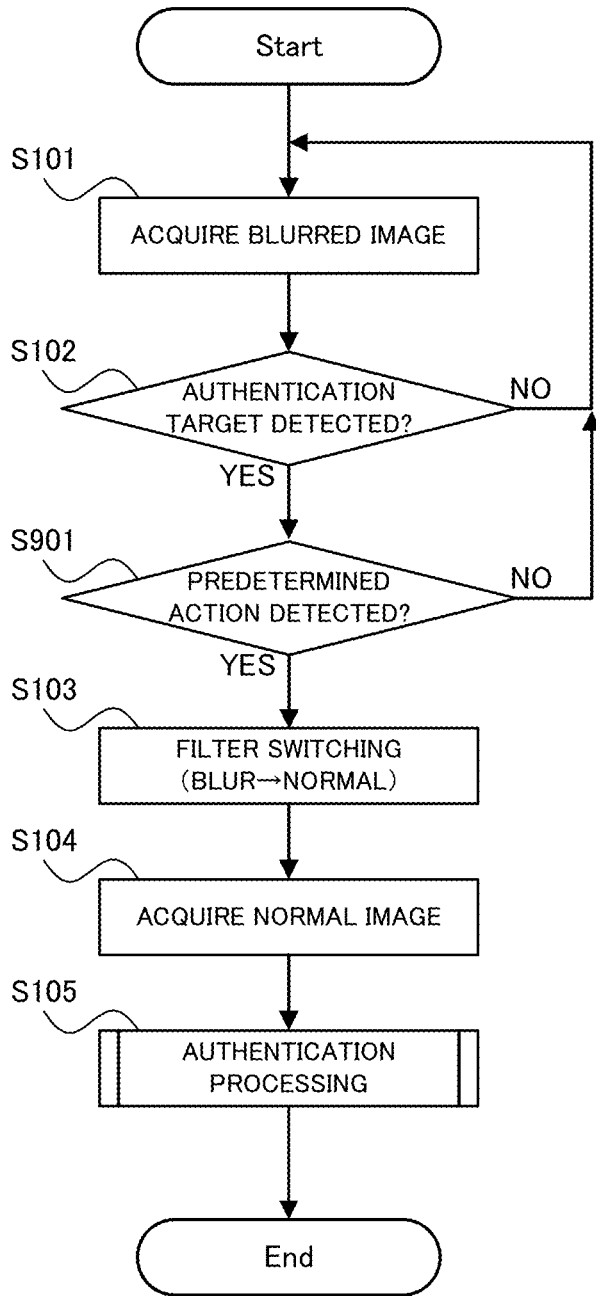
FIG. 19 is a flowchart illustrating a flow of operation by the authentication system according to the ninth example embodiment.

As illustrated in FIG. 19, when the operation of the authentication system 10 according to the ninth example embodiment is started, first, the target detection unit 110 acquires the blurred image captured by the blur imaging (step S101). Then, the target detection unit 110 detects the presence of the authentication target on the basis of the acquired blurred image (step S102). When the authentication target is not detected from the blurred image (the step S102: NO), the processing may be started from the step S101 again.

Subsequently, when the authentication target is detected from the blurred image (the step S102: YES), the predetermined action detection unit 150 detects the predetermined action by the authentication target (step S902). When the predetermined action by the authentication target is not detected (the step S902: NO), the processing may be started from the step S101 again.

When the predetermined action by the authentication target is detected (the step S902: YES), the switching unit 120 gives an instruction of filter switching to the filter switching unit 22 to switch the blur imaging to the normal imaging (step S103). That is, in the authentication system 10 according to the ninth example embodiment, when the authentication target is detected and the authentication target performs the predetermined action, the blur imaging is switched to the normal imaging. Thereafter, the authentication unit 130 acquires the normal image captured by the normal imaging (step S104). Then, the authentication unit 130 performs the authentication processing of authenticating the authentication target, on the basis of the acquired normal image (step S105).

In the above example, the predetermined action is detected only in a case where the presence of the authentication target is detected (e.g., in a case where there is the authentication target who intends to be authenticated), but the predetermined action may be detected from another user other than the authentication target. For example, the predetermined action may be detected from all the users included in an imaging range of the camera. In this case, taking the predetermined action may be a condition for being detected as the authentication target. The switching unit 120 may switch the blur imaging to the normal imaging only in an area where the user who performs the predetermined action is captured. In addition, when there are a plurality of users who performs the predetermined action, the blur imaging may be switched to the normal imaging for a part or all of the users.

The authentication system 10 according to the ninth example embodiment may be configured as a system installed for a monitoring purpose in various facilities. For example, the authentication system 10 may be configured as a system for monitoring whether or not there is a person who behaves suspiciously, in a residential facility such as an apartment, a public facility, a shopping mall, or the like. In this case, when the target takes a predetermined suspicious behavior (a behavior/action that is to be determined to be a suspicious behavior registered in advance), the blur imaging may be switched to the normal imaging.

Technical Effect

Next, a technical effect obtained by the authentication system 10 according to the ninth example embodiment will be described.

As described in FIG. 18 and FIG. 19, in the authentication system 10 according to the ninth example embodiment, in a case where the predetermined action is detected, the blur imaging is switched to the normal imaging. In this way, it is possible to determine a user who wants the authentication processing, and to perform the authentication processing in consideration of the privacy. In addition, it is possible to determine a user who does not want the authentication processing, but for whom the normal imaging is to be performed (e.g., a suspicious person), and to switch the blur imaging to the normal imaging.

Tenth Example Embodiment

The authentication system 10 according to a tenth example embodiment will be described with reference to FIG. 20 and FIG. 21. The tenth example embodiment is partially different from the first to ninth example embodiments only in the configuration and operation, and may be the same as the first to ninth example embodiments in the other parts. For this reason, a part that is different from each of the example embodiments described above will be described in detail below, and a description of other overlapping parts will be omitted as appropriate.

(Functional Configuration)

First, with reference to FIG. 20, a functional configuration of the authentication system 10 according to the tenth example embodiment will be described. FIG. 20 is a block diagram illustrating the functional configuration of the authentication system according to the tenth example embodiment. In FIG. 20, the same components as those illustrated in FIG. 3 carry the same reference numerals.

Figure 20:
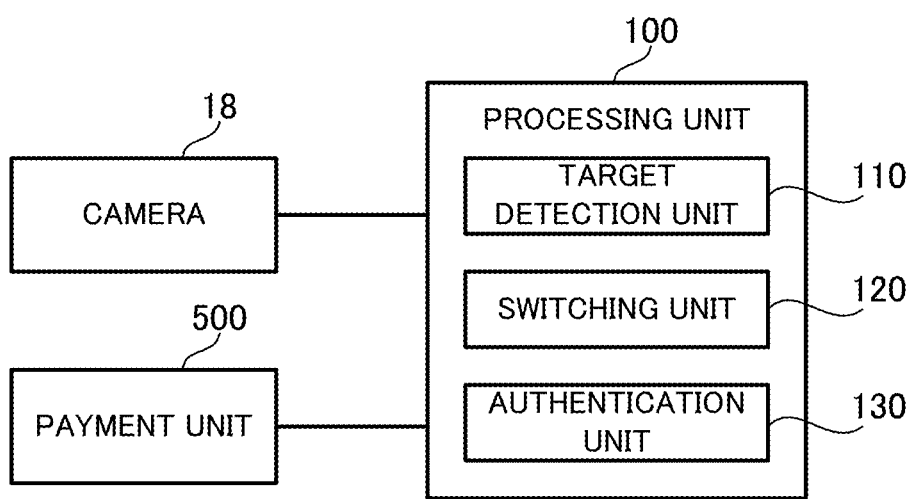
FIG. 20 is a block diagram illustrating a functional configuration of an authentication system according to a tenth example embodiment.

As illustrated in FIG. 20, the authentication system 10 according to the tenth example embodiment includes the camera 18, the processing unit 100, and a payment unit 500. That is, the authentication system 10 according to the tenth example embodiment further includes the payment unit 500, in addition to the configuration according to the first example embodiment (see FIG. 3). The payment unit 500 may be a functional block realized by the processor 11 (see FIG. 1), for example. The payment unit 500 may be included in the processing unit 100.

The payment unit 500 is configured to perform payment/settlement processing on the authentication target. The payment unit 500 may be provided as a register terminal at a store, for example. In a case where the authentication processing of authenticating the authentication target is successful, the payment unit 500 may perform the payment processing of paying for a product to be purchased by the authentication target, by using a payment method associated with the authentication target (e.g., withdrawal by a credit card or from a bank account, etc.). On the other hand, in a case where the authentication processing of authenticating the authentication target is failed, the payment processing may not be performed.

(Flow of Operation)

Next, with reference to FIG. 21, a flow of operation of the authentication system 10 according to the tenth example embodiment will be described. FIG. 21 is a flowchart illustrating the flow of the operation of the authentication system according to the tenth example embodiment. In FIG. 21, the same steps as those illustrated in FIG. 4 carry the same reference numerals.

Figure 21:
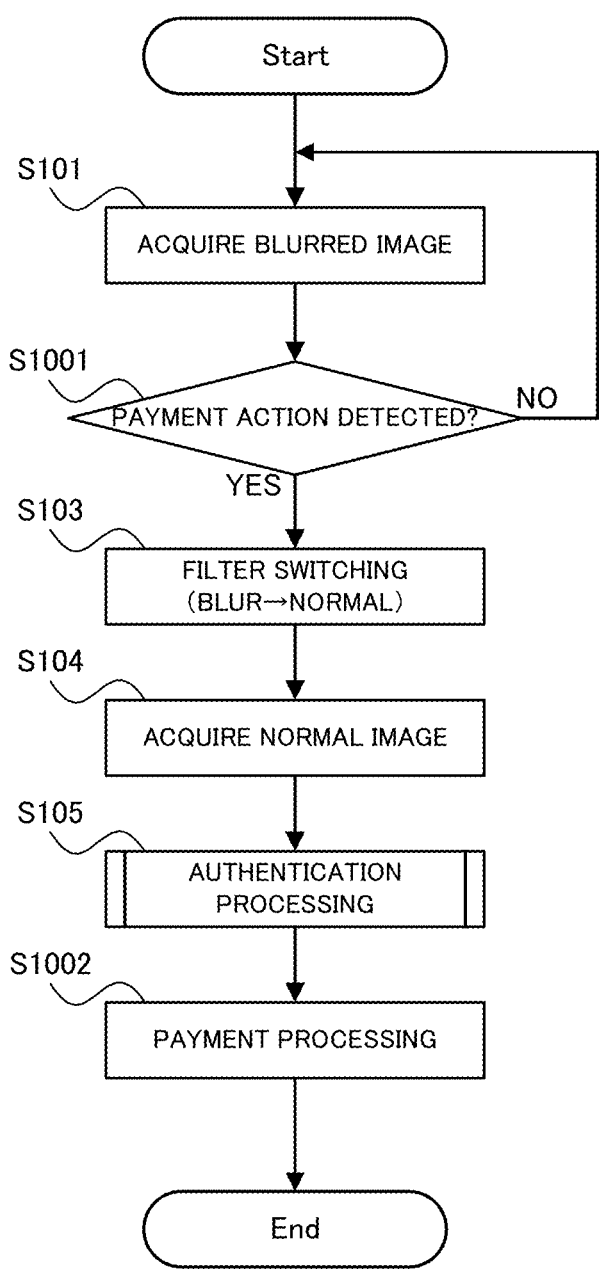
FIG. 21 is a flowchart illustrating a flow of operation by the authentication system according to the tenth example embodiment.

As illustrated in FIG. 21, when the operation of the authentication system 10 according to the tenth example embodiment is started, first, the target detection unit 110 acquires the blurred image captured by the blur imaging (step S101). Then, the target detection unit 110 detects a payment action by the authentication target, on the basis of the acquired blurred image (step S1001). The "payment action" here may be set in advance as an action for determining whether or not the authentication target has an intention of payment. The payment action may be an action that allows the register terminal to read a product to be purchased, for example. Alternatively, the fact that the authentication target enters a predetermined range (e.g., the authentication target arrives at the vicinity of the register), may be detected as the payment action. In this case, position information about the position of the authentication target may be detected from the blurred image, or may be detected by using another sensor, camera, or the like. Combining the above, in a case where the authentication target enters the predetermined range and the product is read by the register terminal, the payment action may be detected. When the payment action is not detected (the step S1101: NO), the processing may be started from the step S101 again.

On the other hand, when the payment action is detected (the step S1101: YES), the switching unit 120 gives an instruction of filter switching to the filter switching unit 22 to switch the blur imaging to the normal imaging (step S103). Thereafter, the authentication unit 130 acquires the normal image captured by the normal imaging (step S104).

Then, the authentication unit 130 performs the authentication processing of authenticating the authentication target, on the basis of the acquired normal image (step S105). When the authentication processing by the authentication unit 130 is successful, the payment unit 500 performs the payment processing (step S1002).

Technical Effect

Next, a technical effect obtained by the authentication system 10 according to the tenth example embodiment will be described.

As described in FIG. 20 and FIG. 21, in the authentication system 10 according to the tenth example embodiment, in a case where the payment action is detected, the blur imaging is switched to the normal imaging. In this way, it is possible to properly perform the authentication processing of authenticating the authentication target and the payment processing in consideration of the privacy of the user.

Eleventh Example Embodiment

The authentication system 10 according to an eleventh example embodiment will be described with reference to FIG. 22 and FIG. 23. The eleventh example embodiment is partially different from the first to tenth example embodiments only in the configuration and operation, and may be the same as the first to tenth example embodiments in the other parts. For this reason, a part that is different from each of the example embodiments described above will be described in detail below, and a description of other overlapping parts will be omitted as appropriate.
(Functional Configuration)

First, with reference to FIG. 22, a functional configuration of the authentication system 10 according to the eleventh example embodiment will be described. FIG. 22 is a block diagram illustrating the functional configuration of the authentication system according to the eleventh example embodiment. In FIG. 22, the same components as those illustrated in FIG. 3 carry the same reference numerals.

Figure 22:
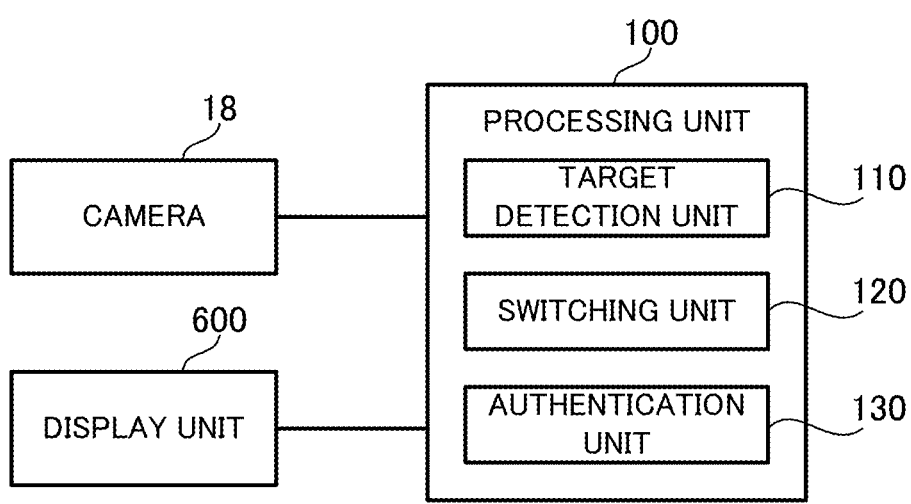
FIG. 22 is a block diagram illustrating a functional configuration of an authentication according to an eleventh example embodiment.

As illustrated in FIG. 22, the authentication system 10 according to the eleventh example embodiment includes the camera 18, the processing unit 100, and a display unit 600. That is, the authentication system 10 according to the eleventh example embodiment further includes the display unit 600, in addition to the configuration according to the first example embodiment (see FIG. 3). The display unit 600 may be realized by the output apparatus 16 (see FIG. 1), for example.

The display unit 600 is configured to display the image captured by the camera 18. That is, the display unit 600 displays the blurred image when the camera 18 performs the blur imaging, and displays the normal image when the camera 18 performs the normal imaging. The display unit 600 may be configured to display the image toward the monitor 30 illustrated in FIG. 5 (i.e., toward the authentication target). Alternatively, the display unit 600 may be configured to display the image toward other than the authentication target. For example, the display unit 600 may be configured as a monitor viewed by an observer or a system administrator/manager.
(Flow of Operation)

Next, with reference to FIG. 23, a flow of operation of the authentication system 10 according to the eleventh example embodiment will be described. FIG. 22 is a flowchart illustrating the flow of the operation of the authentication system according to the eleventh example embodiment. In FIG. 22, the same steps as those illustrated in FIG. 4 carry the same reference numerals.

As illustrated in FIG. 22, when the operation of the authentication system 10 according to the eleventh example embodiment is started, first, the target detection unit 110 acquires the blurred image captured by the blur imaging (step S101). At this time, the display unit 600 displays the blurred image captured by the blur imaging (step S902). Then, the target detection unit 110 detects the presence of the authentication target on the basis of the acquired blurred image (step S102). When the authentication target is not detected from the blurred image (the step S102: NO), the processing may be started from the step S101 again.

On the other hand, when the authentication target is detected from the blurred image (the step S102: YES), the switching unit 120 gives an instruction of filter switching to the filter switching unit 22 to switch the blur imaging to the normal imaging (step S103). At this time, the display unit 600 displays the normal image captured by the normal imaging (step S1102). Thereafter, the authentication unit 130 acquires the normal image captured by the normal imaging (step S104). Then, the authentication unit 130 performs the authentication processing of authenticating the authentication target, on the basis of the acquired normal image (step S105).

Technical Effect

Next, a technical effect obtained by the authentication system 10 according to the eleventh example embodiment will be described.

Figure 23:
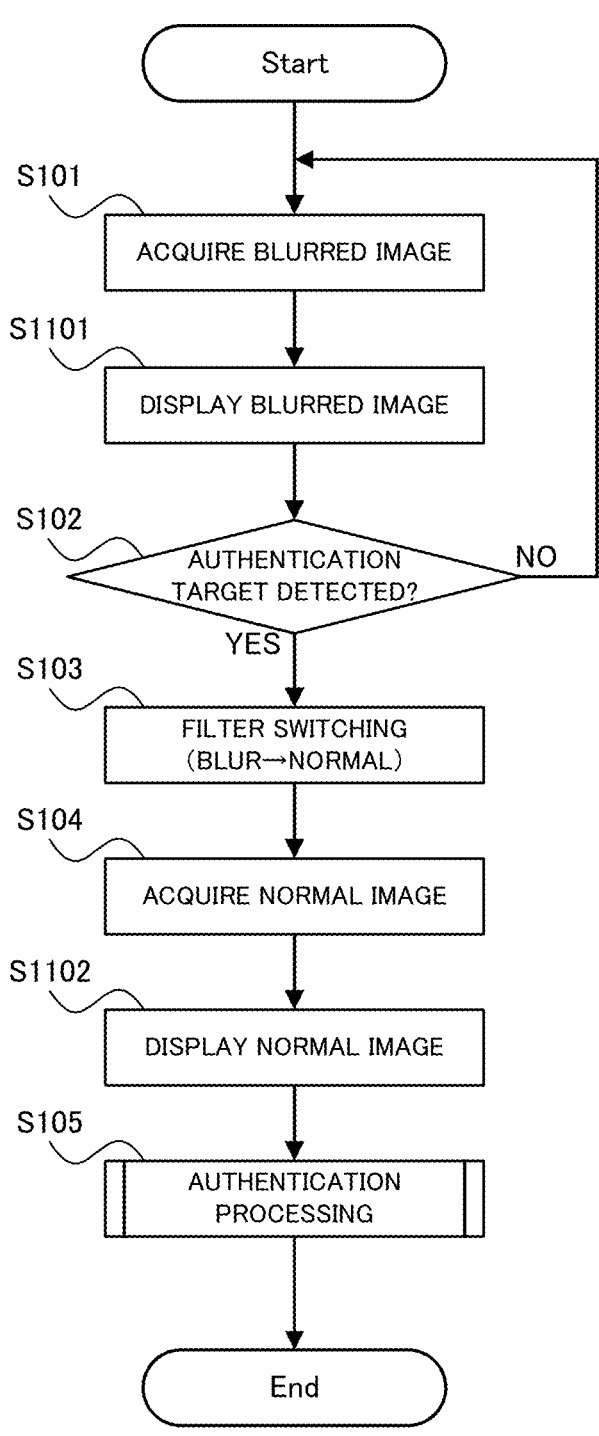
FIG. 23 is a flowchart illustrating a flow of operation by the authentication system according to the eleventh example embodiment.

As described in FIG. 22 and FIG. 23, in the authentication system 10 according to the tenth example embodiment, the blurred image captured by the blur imaging is displayed until the authentication target is detected, and the normal image captured by the normal imaging is displayed after the authentication target is detected. In this way, it is possible to protect the privacy of the image that is displayed. For example, even if a user enters the imaging range of the camera, an image of the user is displayed the blurred image until the user is detected as the authentication target. This makes it possible to prevent a clear image of the user from being displayed even though the user does not intend to be authenticated.

Another Application Example

An application example of the authentication system 10 according to each of the example embodiments described above will be further described.

The authentication system 10 according to the present example embodiment may be configured as a system installed in an airport. For example, the authentication system 10 may be configured as a system that authenticates each of passengers when they board an airplane. The camera 18 may be installed at a boarding gate, for example. In this case, by employing the configuration that the blurring is cancelled only in the face area of a passenger in the front, as described in the fifth example embodiment, it is possible to properly perform the authentication processing, while protecting the privacy of other users near the gate.

A processing method that is executed on a computer by recording, on a recording medium, a program for allowing the configuration in each of the example embodiments to be operated so as to realize the functions in each example embodiment, and by reading, as a code, the program recorded on the recording medium, is also included in the scope of each of the example embodiments. That is, a computer-readable recording medium is also included in the range of each of the example embodiments. Not only the recording medium on which the above-described program is recorded, but also the program itself is also included in each example embodiment.

The recording medium to use may be, for example, a floppy disk (registered trademark), a hard disk, an optical disk, a magneto-optical disk, a CD-ROM, a magnetic tape, a nonvolatile memory card, or a ROM. Furthermore, not only the program that is recorded on the recording medium and that executes processing alone, but also the program that operates on an OS and that executes processing in cooperation with the functions of expansion boards and another software, is also included in the scope of each of the example embodiments. In addition, the program itself may be stored in a server, and a part or all of the program may be downloaded from the server to a user terminal.

<Supplementary Notes>

The example embodiments described above may be further described as, but not limited to, the following Supplementary Notes below.

(Supplementary Note 1)

An authentication system according to Supplementary Note 1 is an authentication system including: an imaging unit that is configure to switch between normal imaging and blur imaging that is imaging in a state of blurring with lower sharpness than that in the normal imaging; a target detection unit that detects an authentication target on the basis of a blurred image acquired by the blur imaging; a switching unit that switches the blur imaging to the normal imaging in a case where the authentication target is detected; and an authentication unit that performs authentication processing of authenticating the authentication targe on the basis of a normal image acquired by the normal imaging.

(Supplementary Note 2)

An authentication system according to Supplementary Note 2 is the authentication system according to Supplementary Note 1, wherein in a case where a face is detected in the blurred image and a size of the face is greater than a predetermined threshold, the target detection unit detects the face as a face of the authentication target.

(Supplementary Note 3)

An authentication system according to Supplementary Note 3 is the authentication system according to Supplementary Note 1, wherein in a case where a moving object is detected in the blurred image and the moving object is approaching the imaging unit, the target detection unit detects the moving object as the authentication target.

(Supplementary Note 4)

An authentication system according to Supplementary Note 4 is the authentication system according to any one of Supplementary Notes 1 to 3, wherein the switching unit identifies a face area in which there is a face of the authentication target, and switches the blur imaging to the normal imaging only in the face area.

(Supplementary Note 5)

An authentication system according to Supplementary Note 5 is the authentication system according Supplementary Note 4, wherein in a case where a plurality of authentication targets are detected, the switching unit switches the blur imaging to the normal imaging only in the face area of the authentication target closest to the imaging unit.

(Supplementary Note 6)

An authentication system according to Supplementary Note 6 is the authentication system according to any one of Supplementary Notes 1 to 5, wherein in a case where the authentication processing of authenticating the authentication target is ended, the switching unit switches the normal imaging to the blur imaging.

(Supplementary Note 7)

An authentication system according to Supplementary Note 7 is the authentication system according to any one of Supplementary Notes 1 to 6, wherein when switching the blur imaging to the normal imaging, the switching unit gradually increases sharpness of an image in accordance with a distance between the authentication target and the imaging unit.

(Supplementary Note 8)

An authentication system according to Supplementary Note 8 is the authentication system according to any one of Supplementary Notes 1 to 7, further including an image storage device that stores the normal image in a case where the authentication processing of authenticating the authentication target is successful, but does not store the normal image in a case where the authentication processing of authenticating the authentication target is failed.

(Supplementary Note 9)

An authentication system according to Supplementary Note 9 is the authentication system according to any one of Supplementary Notes 1 to 8, wherein in a case where the authentication target is detected and a predetermined action by the authentication target is detected, the switching unit switches the blur imaging to the normal imaging.

(Supplementary Note 10)

An authentication method according to Supplementary Note 10 is an authentication method using an imaging unit that is configure to switch between normal imaging and blur imaging that is imaging in a state of blurring with lower sharpness than that in the normal imaging, the authentication method including: detecting an authentication target on the basis of a blurred image acquired by the blur imaging; switching the blur imaging to the normal imaging in a case where the authentication target is detected; and performing authentication processing of authenticating the authentication targe on the basis of a normal image acquired by the normal imaging.

(Supplementary Note 11)

A recording medium according to Supplementary Note 11 is a recording medium on which a computer program that allows at least one computer to execute an authentication method is recorded, the authentication method using a imaging unit that can switch between a normal imaging and a blur imaging in which the sharpness is lower than that of the normal imaging, the authentication method including: detecting an authentication target on the basis of a blurred image acquired by the blur imaging; switching the blur imaging to the normal imaging in a case where the authentication target is detected; and performing authentication processing of authenticating the authentication targe on the basis of a normal image acquired by the normal imaging.

(Supplementary Note 12)

A computer program according to Supplementary Note 12 is a computer program that allows at least one computer to execute an authentication method, the authentication method using a imaging unit that can switch between a normal imaging and a blur imaging in which the sharpness is lower than that of the normal imaging, the authentication method including: detecting an authentication target on the basis of a blurred image acquired by the blur imaging; switching the blur imaging to the normal imaging in a case where the authentication target is detected; and performing authentication processing of authenticating the authentication targe on the basis of a normal image acquired by the normal imaging.

This disclosure is not limited to the examples described above and is allowed to be changed, if desired, without departing from the essence or spirit of this disclosure which can be read from the claims and the entire specification. An authentication system, an authentication method, and a recording medium with such changes are also intended to be within the technical scope of this disclosure.

DESCRIPTION OF REFERENCE CODES

10 Authentication system
11 Processor
14 Storage apparatus
15 Input apparatus
16 Output apparatus
18 Camera
21 Lens
22 Filter switching unit
23 Image sensor
24 Image processing unit
25 Output unit
30 Monitor
50 Target
100 Processing unit
110 Target detection unit
120 Switching unit
130 Authentication unit
140 Image storage unit
150 Predetermined action detection unit
200 Face recognition terminal
300 Gate
305 Passage confirmation sensor
400 Face recognition server storage
500 Payment unit
600 Display unit

What is claimed is:

1. An authentication system comprising:
an imaging unit that is configured to switch between normal imaging and blur imaging that is imaging in a state of blurring with lower sharpness than that in the normal imaging;
at least one memory that is configured to store instructions; and
at least one processor that is configured to execute the instructions to:
detect an authentication target on the basis of a blurred image acquired by the blur imaging;
switch the blur imaging to the normal imaging in a case where the authentication target is detected from the blurred image; and
perform authentication processing of authenticating the authentication target on the basis of a normal image acquired by the normal imaging.

2. The authentication system according to claim 1, wherein the at least one processor is configured to execute the instructions to, in a case where a face is detected in the blurred image and a size of the face is greater than a predetermined threshold, detect the face as a face of the authentication target.

3. The authentication system according to claim 1, wherein the at least one processor is configured to execute the instructions to, in a case where a moving object is detected in the blurred image and the moving object is approaching the imaging unit, detect the moving object as the authentication target.

4. The authentication system according to claim 1, wherein the at least one processor is configured to execute the instructions to identify a face area in which there is a face of the authentication target, and switch the blur imaging to the normal imaging only in the face area.

5. The authentication system according claim 4, wherein the at least one processor is configured to execute the instructions to, in a case where a plurality of authentication targets are detected, switch the blur imaging to the normal imaging only in the face area of the authentication target closest to the imaging unit.

6. The authentication system according to claim 1, wherein the at least one processor is configured to execute the instructions to, in a case where the authentication processing of authenticating the authentication target is ended, switch the normal imaging to the blur imaging.

7. The authentication system according to claim 1, wherein the at least one processor is configured to execute the instructions to, when switching the blur imaging to the normal imaging, gradually increase sharpness of an image in accordance with a distance between the authentication target and the imaging unit.

8. The authentication system according to claim 1, wherein the at least one processor is configured to execute the instructions to store the normal image in a case where the authentication processing of authenticating the authentication target is successful, but not store the normal image in a case where the authentication processing of authenticating the authentication target is failed.

9. The authentication system according to claim 1, wherein the at least one processor is configured to execute the instructions to, in a case where the authentication target is detected and a predetermined action by the authentication target is detected, switch the blur imaging to the normal imaging.

10. A computer implemented authentication method using an imaging unit that is configured to switch between normal imaging and blur imaging that is imaging in a state of blurring with lower sharpness than that in the normal imaging, the authentication method comprising:
detecting an authentication target on the basis of a blurred image acquired by the blur imaging;
switching the blur imaging to the normal imaging in a case where the authentication target is detected from the blurred image; and
performing authentication processing of authenticating the authentication target on the basis of a normal image acquired by the normal imaging.

11. A non-transitory recording medium on which a computer program that allows at least one computer to execute an authentication method is recorded, the authentication method using an imaging unit that can switch between a normal imaging and a blur imaging in which the sharpness is lower than that of the normal imaging, the authentication method including:
detecting an authentication target on the basis of a blurred image acquired by the blur imaging;
switching the blur imaging to the normal imaging in a case where the authentication target is detected from the blurred image; and
performing authentication processing of authenticating the authentication target on the basis of a normal image acquired by the normal imaging.

* * * * *